US010708042B1

(12) United States Patent
Rubenstein et al.

(10) Patent No.: US 10,708,042 B1
(45) Date of Patent: Jul. 7, 2020

(54) COMPUTER-BASED SYSTEMS INCLUDING BLOCKCHAINS WITH DIFFERENTIAL PERMISSIONING AND VAULTING OF TOKENS AND TOKEN EXCHANGES AND METHODS OF USE THEREOF

(71) Applicant: Yield Solutions Group, LLC, Denver, CO (US)

(72) Inventors: Reid Rubenstein, Golden, CO (US); David Sunshine, Greenwood Village, CO (US); Mark Schwartz, Cherry Hills Village, CO (US); Jason Wilcox, Denver, CO (US)

(73) Assignee: Yield Solutions Group, LLC, Denver, CO (US)

( * ) Notice: Subject to any disclaimer, the term of this patent is extended or adjusted under 35 U.S.C. 154(b) by 0 days.

(21) Appl. No.: 16/700,402

(22) Filed: Dec. 2, 2019

(51) Int. Cl.
| | |
|---|---|
| *H04L 9/32* | (2006.01) |
| *H04L 9/06* | (2006.01) |
| *H04L 29/06* | (2006.01) |
| *H04L 29/08* | (2006.01) |
| *G06Q 40/04* | (2012.01) |
| *G06Q 20/38* | (2012.01) |

(52) U.S. Cl.
CPC ........ *H04L 9/0643* (2013.01); *H04L 63/0428* (2013.01); *H04L 67/1095* (2013.01); *G06Q 20/38215* (2013.01); *G06Q 40/04* (2013.01); *G06Q 2220/00* (2013.01)

(58) Field of Classification Search
CPC ............... H04L 9/0643; H04L 63/0428; H04L 67/1095; G06Q 20/38215; G06Q 40/04; G06Q 2220/00
See application file for complete search history.

(56) References Cited

U.S. PATENT DOCUMENTS

| 10,540,654 B1* | 1/2020 | James | G06Q 20/3829 |
|---|---|---|---|
| 2016/0092988 A1* | 3/2016 | Letourneau | G06Q 40/06 705/66 |
| 2018/0341930 A1* | 11/2018 | Moir | G06Q 20/0655 |
| 2019/0028276 A1* | 1/2019 | Pierce | G06Q 20/3827 |
| 2019/0043048 A1* | 2/2019 | Wright | G06Q 20/405 |
| 2019/0050541 A1* | 2/2019 | Wright | G06Q 20/3829 |
| 2019/0052454 A1* | 2/2019 | Wright | H04L 9/0861 |
| 2019/0057362 A1* | 2/2019 | Wright | H04L 9/0643 |
| 2019/0311337 A1* | 10/2019 | Madisetti | G06Q 20/02 |

* cited by examiner

*Primary Examiner* — Baotran N To
(74) *Attorney, Agent, or Firm* — Greenberg Traurig, LLP

(57) ABSTRACT

Systems and methods of the present disclosure include receiving an electronic request to exchange data items. A digital asset associated with the exchange of the data items is generated including a vault unique identifier, and an asset owner. An exchange block is generated on an exchange chain to record the electronic request. An asset copy is generated on the exchange ledger chain to record a non-permissioned copy of the digital asset independent from the vault unique identifier. An asset block is generated on an asset ledger chain to record an authoritative copy of the digital asset associated with the exchange of the data items on the exchange chain; where the asset block header includes an asset block hash concatenated with the vault unique identifier associated with the digital asset. The authoritative copy of the digital asset associated with the electronic request is displayed in response to a user selection.

20 Claims, 10 Drawing Sheets

US 10,708,042 B1

COMPUTER-BASED SYSTEMS INCLUDING BLOCKCHAINS WITH DIFFERENTIAL PERMISSIONING AND VAULTING OF TOKENS AND TOKEN EXCHANGES AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Yield Solutions Group, LLC, All Rights Reserved.

FIELD OF TECHNOLOGY

The present disclosure generally relates to improved computer-based platforms/systems configured for one or more novel technological applications of blockchains with differential permissioning and vaulting of tokens and token exchange, and methods of use thereof.

BACKGROUND OF TECHNOLOGY

A computer network platform/system may include a group of computers (e.g., clients, servers, smart routers (e.g., trading smart routers)) and other computing hardware devices that are linked together through one or more communication channels to facilitate communication and/or resource-sharing, via one or more specifically programmed graphical user interfaces (GUIs) of the present disclosure, among a wide range of users.

Digital assets may be recorded on a blockchain for immutable ownership data. The exchange and ownership of tokens on a blockchain may be proved by verification or authentication of a cryptographic key associated with the token owner.

SUMMARY OF DESCRIBED SUBJECT MATTER

In some embodiments, the present disclosure provides an exemplary technically improved computer-based method that includes at least the following steps of receiving, by at least one processor, an electronic request to exchange data items between a first user and a second user. The at least one processor generates a digital asset associated with the exchange of the data items; where the digital asset includes: i) a vault unique identifier, and ii) an asset owner including the first user, the second user, or both; where the vault unique identifier includes a hash of storage location data; where the storage location data includes at least a storage drive identifier associated with a storage location for storing the digital asset. The at least one processor generates an exchange block on an exchange chain to record the electronic request; where the exchange block includes an exchange block header; where the exchange block header includes an exchange block hash based at least in part on: i) the electronic request, ii) the data items, and iii) at least one prior exchange block header associated with at least one prior exchange block on the exchange chain. generating, by the at least one processor, an asset copy on the exchange ledger chain to record a non-permissioned copy of the digital asset independent from the vault unique identifier; where the non-permissioned copy of the digital asset is configured to be transferred on the exchange chain independent from the storage location. The at least one processor generates an asset block on an asset ledger chain to record an authoritative copy of the digital asset associated with the exchange of the data items on the exchange chain; where the asset ledger chain includes a permissioned ledger different from the exchange chain; where the asset block includes an asset block header; where the asset block header includes an asset block hash concatenated with the vault unique identifier associated with the digital asset; where the asset block hash includes a hash based at least in part on: i) the exchange block header, ii) an asset identifier that identifies the digital asset, and iii) at least one prior asset block header associated with at least one prior asset block on the asset ledger chain; where the asset block hash and the vault unique identifier include independent factors of authentication of the digital asset. The at least one processor causes to display the authoritative copy of the digital asset associated with the electronic request.

In some embodiments, the present disclosure provides an exemplary technically improved computer-based method that includes at least the following steps of receiving, by at least one processor, an electronic request to modify at least one digital asset associated with at least one user according to at least one modification; where each respective digital asset of the at least one digital asset includes: i) a vault unique identifier associated with an authentic storage location of each respective digital asset, ii) at least one data item representing the at least one modification associated with each respective digital asset, and ii) an asset owner associated with each respective digital asset; where the vault unique identifier includes a hash of storage location data; where the storage location data includes at least a storage drive identifier associated with a storage location for storing each respective digital asset. The at least one processor generates an exchange block on an exchange chain to record the electronic request; where the exchange block includes an exchange block header; where the exchange block header includes an exchange block hash based at least in part on: i) the electronic request, ii) the at least one data item, and iii) at least one prior exchange block header associated with at least one prior exchange block on the exchange chain. The at least one processor generates an asset copy on the exchange ledger chain to record a non-permissioned copy of each respective digital asset independent from the vault unique identifier of each respective digital asset; where the non-permissioned copy of each respective digital asset is configured to be modified on the exchange chain independent from the storage location. The at least one processor generates an asset block on an asset ledger chain to record an authoritative copy of the at least one digital asset with the at least one modification associated with the electronic request; where the asset ledger chain includes a permissioned ledger different from the exchange chain; where the asset block includes an asset block header; where the asset block header includes an asset block hash concatenated with the vault unique identifier associated with each respective digital asset; where the asset block hash includes a hash based at least in part on: i) the exchange block header, ii) an asset identifier that identifies each respective digital asset, and iii) at least one prior asset block header associated with at least one prior asset block of each respective digital asset on the asset ledger chain; where the asset block hash and the vault unique identifier include independent factors of authentication of the at least one digital asset. The at least one processor causes to display the authoritative copy of each respective digital asset associated with the electronic request.

In some embodiments, the present disclosure provides an exemplary technically improved computer-based system that includes at least the following components of a distributed network of at least one node, and at least one processor in communication with the distributed network. The at least one processor is configured to: receive an electronic request to exchange data items between a first user and a second user; generate a digital asset associated with the exchange of the data items; where the digital asset includes: i) a vault unique identifier, and ii) an asset owner including the first user, the second user, or both; where the vault unique identifier includes a hash of storage location data; where the storage location data includes at least a storage drive identifier associated with a storage location for storing the digital asset; generate an exchange block on an exchange chain to record the electronic request; where the exchange block includes an exchange block header; where the exchange block header includes an exchange block hash based at least in part on: i) the electronic request, ii) the data items, and iii) at least one prior exchange block header associated with at least one prior exchange block on the exchange chain; generating, by the at least one processor, an asset copy on the exchange ledger chain to record a non-permissioned copy of the digital asset independent from the vault unique identifier; where the non-permissioned copy of the digital asset is configured to be transferred on the exchange chain independent from the storage location; generate an asset block on an asset ledger chain to record an authoritative copy of the digital asset associated with the exchange of the data items on the exchange chain; where the asset ledger chain includes a permissioned ledger different from the exchange chain; where the asset block includes an asset block header; where the asset block header includes an asset block hash concatenated with the vault unique identifier associated with the digital asset; where the asset block hash includes a hash based at least in part on: i) the exchange block header, ii) an asset identifier that identifies the digital asset, and iii) at least one prior asset block header associated with at least one prior asset block on the asset ledger chain; where the asset block hash and the vault unique identifier include independent factors of authentication of the digital asset; cause to display the authoritative copy of the digital asset associated with the electronic request on a screen of at least one computing device associated with at least one user.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
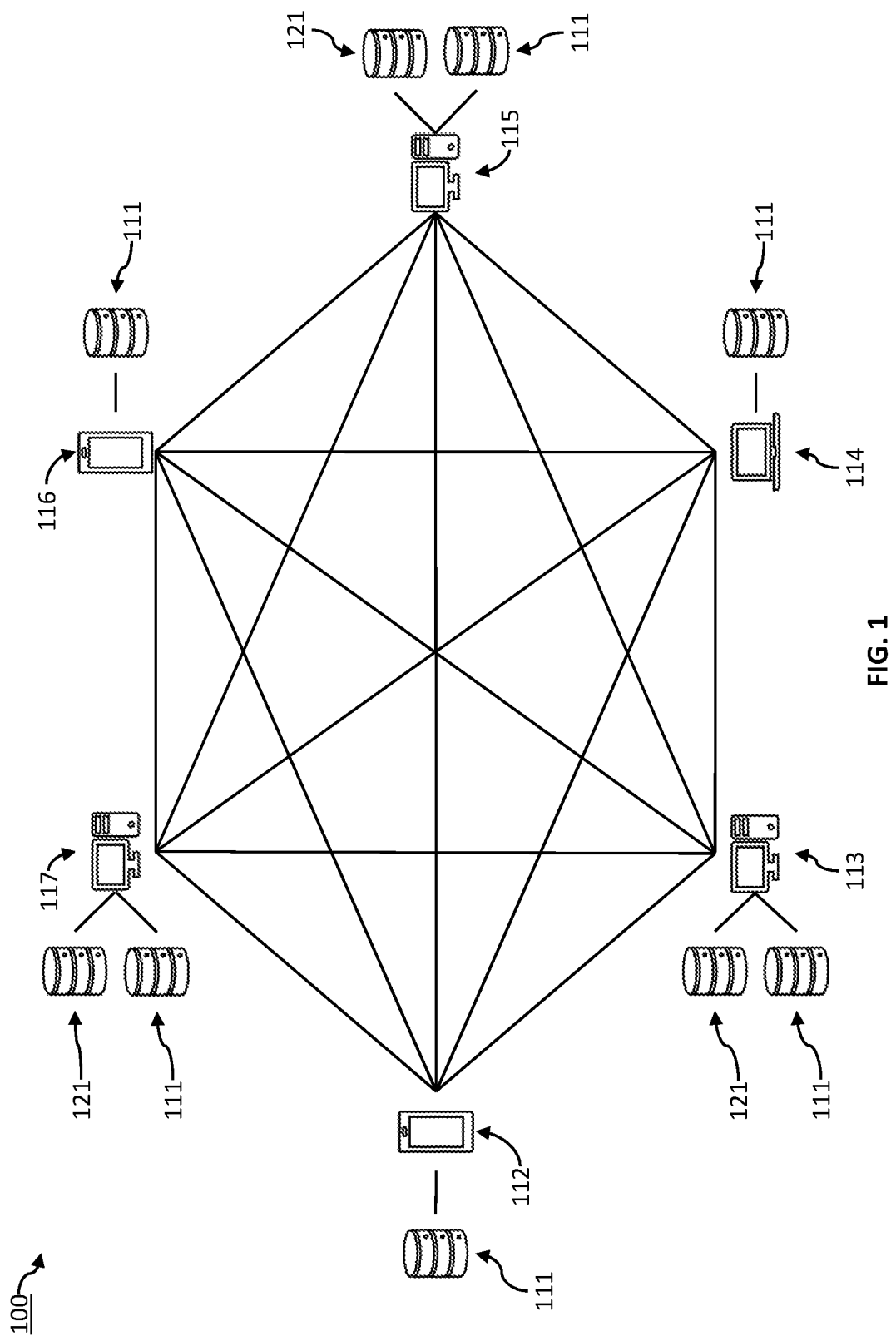
FIGS. 1-10 show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35) .NET Framework, (36) Silverlight, (37) Open Web Platform, (38) Oracle Database, (39) Qt, (40) SAP NetWeaver, (41) Smartface, (42) Vexi, and (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIP-EMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

In some embodiments, users can be traders, representing physical end users, custodians, hedge funds, and/or proprietary algorithmic trade execution firms.

As used herein, a "financial instrument" refers to an equity ownership, debt or credit, typically in relation to a corporate or governmental entity, where the financial instrument is typically traded via one or more financial trading venues. Some examples of "financial instruments" can include, but are not limited to, stocks, bonds, commodities, swaps, futures, and currency.

FIGS. 1 through 10 illustrate systems and methods of differentially permissioned blockchains for ownership and custodianship management of tokens. The following embodiments provide technical solutions and/or technical improvements that overcome technical problems, drawbacks and/or deficiencies in the technical fields involving distributed networking on permissioned and permissionless networks. As explained in more detail, below, technical solutions and/or technical improvements herein include aspects of improved security, encryption, authentication, communication and data transfer on distributed networks. Based on such technical features, further technical benefits become available to users and operators of these systems and methods. Moreover, various practical applications of the disclosed technology are also described, which provide further practical benefits to users and operators that are also new and useful improvements in the art.

FIG. 1 is a block diagram of another exemplary computer-based system with intertwined blockchains having differential permissioning and vaulting in accordance with one or more embodiments of the present disclosure.

In some embodiments, an exemplary inventive distributed network 100 with intertwined blockchains includes multiple nodes in communication with each other. In some embodiments, the nodes may include, e.g., computing devices such as mobile computing devices including smartphones and tablets, personal computers, servers, datacenters, network attached storage, cloud platforms, among other computing devices and combinations thereof. In some embodiments, some of the nodes are permissioned for access and manipulation of tokens, while some nodes are permissionless, with access to view tokens and/or copies of tokens, and submit requests for transactions. In some embodiments, to facilitate the differential permissions such that every user at every node may have engage in the exchange and transactions of tokens, while only a subset of "custodian" nodes may access the token itself, two or more blockchains may be intertwined to manage activity with respect to the tokens. Accordingly, the exemplary inventive distributed network 100 facilitates both public token transactions, as well as secure, permissioned vaulting of tokens, such as, e.g., digital assets, including financial instruments (e.g., contracts, mortgages, loans, payables, receivables), securities, stocks, bonds, futures, letters of credit, debt, equity linked notes, deposits of cash, titles, deeds, among other digitized assets and combinations thereof.

In some embodiments, custodian nodes 113, 115 and 117 may be permissioned to provide vaulting to tokens and other digitized assets. As such, custodian nodes 113, 115 and 117 may be permissioned to, e.g., manage documents post signature (e.g., storage, rights/permissions, certificates, etc.), manage access for, e.g., internal staff, clients and third-party access, securely transferring the tokens and/or digital assets. The remainder of the nodes, e.g., permissionless or public nodes 112, 114 and 116 may not have such vaulting functionality. Rather, the permissionless or public nodes 112, 114 and 116 may only submit electronic requests for transactions or exchanges of tokens and/or digital assets.

In some embodiments, the differential permissioning with token and/or digital asset vaulting may be facilitated by intertwining two separate blockchains in intertwined ledgers 111 such that each node 112-117 may interact with a public facing ledger that communicates with a private ledger that is only directly accessibly by custodian nodes 113, 115 and 117. In some embodiments, the public facing ledger and the private facing ledger may be stored separately on different devices. Indeed, in some embodiments, one or more of the nodes 112-117 may not have a copy of the private ledger stored thereon. However, in some embodiments, the public ledger of the intertwined ledgers 111 appears at each node 112-117 and links to the private ledger, wherever the private ledger is maintained. Thus, the custodian nodes 113, 115 and 117 may manage, create and/or modify assets and associated asset vaults while the permissionless nodes 112, 114 and 116 may submit transaction requests to the intertwined ledgers 111 to request to transact and/or exchange tokens and/or digital assets. In some embodiments, the intertwined ledgers 111 may record transactions of tokens and/or digital assets by interacting the tokens and/or digital assets in e.g., vaults 121 in communication with respective custodian nodes 113, 115 and 117 via, e.g., smart contracts, or other automated device.

In some embodiments, the vault of each token and/or digital asset may include, e.g., a storage location, storage device, storage address, or other storage data associated with physical and/or digital location of each token and/or asset. In some embodiments, the intertwined ledgers 111 record vault locations (e.g., vaults 121) that store a physical and/or digital asset. For example, in some embodiments, the intertwined ledgers 111 record a location of an authoritative copy of an asset to vault the asset within a storage device or storage location, such producing the vaults 121. The vaults 121 may, therefore, be verified in the intertwined ledgers 111 to verify the authoritative copy of the tokens and/or digital assets using, e.g., storage data associated with the respective vaults 121. In some embodiments, for the vaulting of assets to occur, the intertwined ledgers 111 must be instantiated at a node with a vault 121.

In some embodiments, the intertwined ledgers 111 may provide functionality to verified custodians of the vaults 121 for management of the transactions of the tokens and/or digital assets. For example, in some embodiments, a digital asset including an electronic document may be signed, and at the time of signing the intertwined ledgers 111 may securely record the transactions that occur as well as record the hash of the fully signed electronic document.

In some embodiments, the hash of the signed electronic document, including, e.g., the storage location, such as in a cloud storage, may provide a unique identifier for the electronic document at that point in time. Any access to the document (e.g., changes, backups, etc.) may also be recorded in the intertwined ledgers 111. In some embodiments, by storing only the hash of the electronic document, the system can rely on more robust encrypted storage systems that have significant redundancy and backup measures that can be put in place.

Thus, in some embodiments, the intertwined ledgers 111 may provide access to the electronic document is the respective vault 121 for custodial or transfer purposes using, e.g., a private asset ledger, with any access, copying, etc. immutably recorded and restricted to trusted parties of the respective custodian nodes 113, 115 and 117. Meanwhile, the intertwined ledgers 111 may also provide public facing functionality including providing an authoritative ledger of transactions that have occurred against the electronic document since the point in time when it was signed and secured. In some embodiments, any user may access the intertwined ledgers 111 to transact against tokens and/or digital assets, including the electronic documents, using, e.g., non-authoritative copies. In some embodiments, such transactions are recorded in, e.g., a public exchange ledger without compromising the authoritative copy of the electronic document itself.

Figure 2:
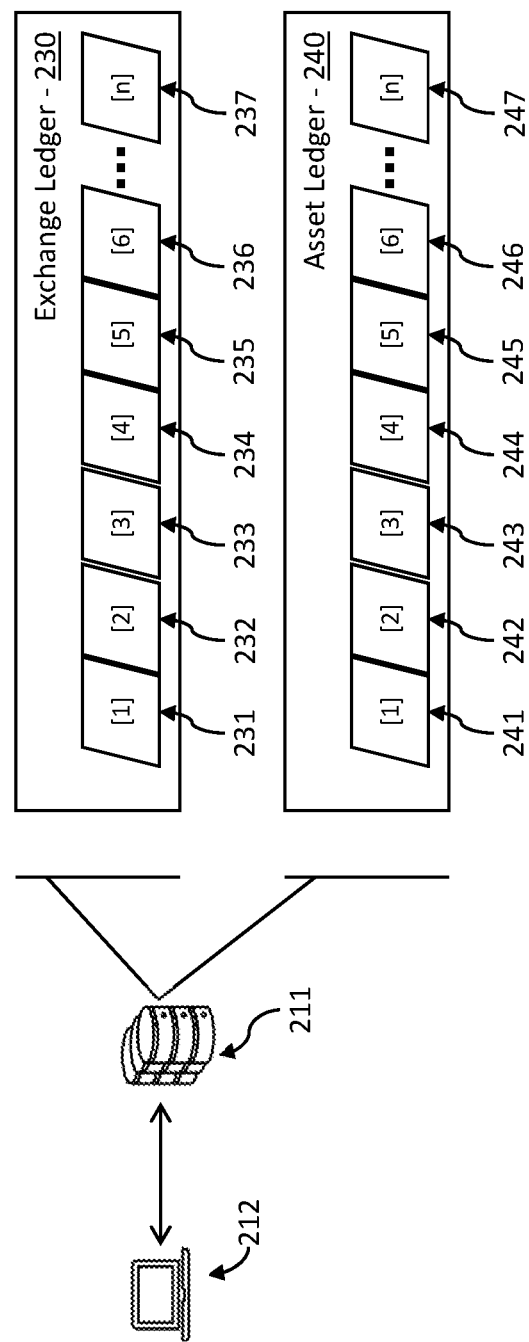

FIG. 2 is a block diagram of another exemplary computer-based system with a blockchain system having differential permissioning and vaulting with multiple ledgers in accordance with one or more embodiments of the present disclosure.

In some embodiments, each node 212 on a distributed network, such as a blockchain network of the distributed network 100 described above, includes a connection to intertwined ledgers 211. In some embodiments, the intertwined ledgers 211 include a single device including the node 212. However, in some embodiments, the exchange ledger 230 and the asset ledger 240 are maintained across a system of devices in communication with the node 212. In some embodiments, the intertwined ledgers 211 provide a public exchange for transacting tokens and/or digital assets, and a private asset recordation for recording immutable authoritative copies of the tokens and/or digital assets. The public exchange and the private asset recordation interoperate such that permissionless node may only access non-authoritative copies and request transactions, while custodians may manage, modify and/or move the authoritative copies.

In some embodiments, the intertwined ledgers 211 include a public facing ledger and a private facing ledger including an exchange ledger 230 and an asset ledger 240, respectively. The exchange ledger 230 and asset ledger 240 cooperate to facilitate open and public transactions against secured, immutable digital assets with secured and authoritative storage recordation. Accordingly, in some embodiments, differential permissioning is applied to the exchange ledger 230 and asset ledger 240 system of intertwined ledgers 211.

In some embodiments, the exchange ledger 230 includes a chain of blocks 231-237 linked together. For example, block [2] 232 may be linked to block [1] 231 by, e.g., incorporating a block hash of the block [1] 231 into a header of the block [2] 232. In some embodiments, any user on the distributed network, such as user of the node 212, may write to the exchange ledger 230 and append a block to the chain. In some embodiments, the user may submit an electronic request for a transaction to the exchange ledger 230. The transaction may include one or more other users on the distributed network, or the transaction may be a single-party transaction. In some embodiments, transactions may include, e.g., an exchange of data items including tokens, digital assets or other data items and combinations thereof, a transfer of data items, aggregating, removing, selling, trading, forfeiting data items, or other transaction. In some embodiments, the transactions may pertain to financial transactions, such as sales, loans, or other exchange of data items representing goods, services, documents, financial instruments, currency, and other assets and combinations thereof.

In some embodiments, a block may record the transaction according to transaction details and data items being transacted. For example, in some embodiments, the electronic request may include transaction details, such as, e.g., the type of transaction, the parties involved, the asset being transacted against including non-authoritative copies of the asset, and any blocks 241-247 in the asset ledger 240 related to the transaction. In some embodiments, to store the transaction data, each block 231-237 may include a container data structure storing one or more of the transactions, including, e.g., data representing the transaction details. The container may then be hashed and added to the blockchain. For example, block [2] 232 is appended to block [1] 231, and block [3] 233 is appended to block [2] 232, etc. as transactions are added to the exchange ledger 230.

In some embodiments, each transaction is hashed to a block by hashing the transaction details into a header for the block. In some embodiments, the data is hashed such that it can be included in a header of the block using, for example, a Merkle root determined using a Merkle tree with the transaction data. In some embodiments, the hash of data can be combined with other header data, such as, e.g., a current time, a block identifier, a previous block identifier, a block version, a hashed header from a previous block, a block height, among other header data and combinations thereof. In some embodiments, the combination of the hashed transaction data and the header data may be hashed to form a current block header. Thus, in some embodiments, the block header of the current block, such as, e.g., block [n] 237, includes a hash of the previous block header, and a hash of the transaction data with a reference to and/or copies of tokens and/or digital assets being transacted against. However, in some embodiments, an authoritative copy of the token and/or digital asset itself may not be included.

Rather, in some embodiments, the asset ledger 240 records the tokens and/or digital assets associated with transactions performed on the exchange ledger 230. In some embodiments, transactions on the exchange ledger 230 are made against existing tokens and/or digital assets recorded on the asset ledger 240. In some embodiments, the existing tokens and/or digital assets include, e.g., authoritative copies of a digitized version of an asset, such as, e.g., an electronic document of a contract, lien, title, loan, security, payable, receivable, equity, or other asset. The owner of an asset may transact against the asset on the exchange ledger 230 by, e.g., proving ownership by supplying both private and public key information and recreate the appropriate hash from associated block on the asset ledger 240. However, in some embodiments, the custodian may only affect the asset on the asset ledger 240. Thus, e.g., an owner may submit a request to the custodian, such as, e.g., a bank, or other custodian different from the owner, via the exchange ledger 230, and the custodian may authorize changes resulting from the transaction (e.g., changing ownership, moving to a new custodian's vault, etc.). Such changes may be recorded in both the exchange ledger 230 and the asset ledger 240 by, e.g., recording the transaction and invalidating the copy in the original vault to then make the new vault the authoritative storage location.

In some embodiments, the user 212 may not have access to the recorded, authoritative copies on the asset ledger 240.

However, in some embodiments, the transactions may affect the tokens and/or digital assets. Thus, in some embodiments, transactions affecting existing tokens and/or assets may be executed on the asset ledger 240 through the use of, e.g., by automated transaction enforcement protocols, such as, e.g., smart contracts, among other transaction devices. Thus, in some embodiments, the exchange ledger 230 may recognize the references to tokens and/or assets in the transaction data of a block 231-237 of the exchange ledger 230, and instantiate, e.g., a smart contract to locate the associated tokens and/or digital assets in a respective block on the asset ledger 240, and update the associated tokens and/or digital assets tokens. In some embodiments, updating the tokens and/or digital assets includes, e.g., generating a new block in the asset ledger 240 for the respective tokens and/or digital assets with new asset owner data.

In some embodiments, a transaction on the exchange ledger 230 forms a new asset. For example, in some embodiments, the new asset includes, e.g., a contract, a payable, a receivable, a loan, a lien, a mortgage, or other digitized asset. Thus, the exchange ledger 230 may instantiate, e.g., a smart contract that generates the digital asset and records the digital asset on the asset ledger 240. In some embodiments, the smart contract also automatically determines a storage location for the digital asset created from the transaction. In some embodiments, the new digital asset is recorded by appending a new block to the asset ledger 240 including, e.g., the asset owner, the storage location, the asset details among other data related to the new digital asset.

In some embodiments, the instantiated smart contract, whether upon a transaction modifying an existing token and/or digital asset, or upon a transaction creating a new digital asset, records the associated token and/or asset to the asset ledger 240 by generating a new block. In some embodiments, the blocks 241-247 of the asset ledger 240 include asset data, such as, e.g., an owner associated with each token and/or asset on a block. Accordingly, the asset data may be hashed to the header of the new block as, e.g., a Merkle root using a Merkle tree. In some embodiments, the header of each block on the asset chain also includes the hash of the previous block header, the time and the hash of the block header for the block on that exchange ledger 230 that created the new digital asset. For example, where a transaction is recorded on the exchange ledger 230, a new exchange block, e.g., block [n] 237 is appended to the chain. The resulting affect to tokens and/or digital assets is recorded to the asset chain 240 by including the hash of the block [n] 237 header. Thus, in some embodiments, the new block on the asset ledger 240 is tied to the associated block on the exchange ledger 230, intertwining the two ledgers. As a result, the asset ledger 240 maintains a record of authoritative tokens and/or digital assets along with references to each transaction affecting each token and/or digital asset such that the exchange ledger 230 may have transactions and blocks 231-237 that do not directly affect the creation of an asset ledger 240 block 241-247 such as, e.g., backups, integrity checks and other transactions.

Moreover, in some embodiments, a storage location may be made immutable and authoritative for each token and/or asset by adding storage location data to the block header of the block on the asset ledger 240. In some embodiments, the asset ledger 240 may receive a storage location identifier from the exchange ledger 230, from the smart contract, or may otherwise automatically determine the storage location associated with each token and/or asset based on where the token and/or digital asset is digitally located. For example, in some embodiments, the storage location may include storage location data including, e.g., a storage device identifier, a storage address, vault software (e.g., storage management software or other software implemented on the vault), or other storage location data. In some embodiments, the storage location data is hashed or encrypted to form a vault unique identifier (UID), and concatenated in the associated asset block 241-247 header with the block 241-247 header hash. In some embodiments, the block 241-247 header may be hashed with the vault UID, however in some embodiments, the vault UID is concatenated with the hashed header. As a result, in some embodiments, the block 241-247 recording each token and/or digital asset is tied to an authentic storage location, creating an immutable vault holding each associated token and/or asset that is secure from access by non-permissioned users at the node 212.

In some embodiments, ownership of an asset may be recorded by transactions in the exchange ledger 230 while the authoritative copy and its storage location are recorded in the asset ledger 240. Thus, in some embodiments, ownership and custodianship may be separated, such that an owner may transact against a token and/or digital asset, while the custodian maintains the authoritative copy of the token and/or asset. For example, a user's relationship to an asset may fall within a set of profiles governing permission or authentication to access, modify and transact against the asset. In some embodiments, profiles may include, e.g., owner, custodian, broker, third-party, among other appropriate profiles, where the custodian and owner may modify assets and asset locations, make copies, etc., while broker's may record copies on behalf of an owner, and the only the owner may authorize a transaction against the asset, and the third-party may only view the asset and act a receiving party in a transaction.

In some embodiments, a transaction on the exchange ledger 230 may only modify an asset of the asset ledger 240 where ownership from a user associated with transaction can be proven. In some embodiments, ownership may be implied by a matching of a user identifier with owner information included with the transaction data or other recordation of ownership in the exchange ledger 230. An owner may also have custodianship of the authoritative copy by, e.g., transferring a storage location of the associated token and/or digital asset to a storage location controlled by the owner. In some embodiments, the transfer may be implemented on the exchange ledger 230, which may instantiate a smart contract to move the authoritative copy to the new storage location, generate a new block on the asset ledger 240 recording the authoritative copy and its new storage location, and invalidating any old blocks recording old storage locations for the token and/or asset. Thus, the authoritative copy is immutably stored and recorded in an up to date fashion on the asset ledger 240, with a record of the transfer recorded on the exchange ledger.

The use of intertwined ledgers 211 facilitates improved performance and security of transactions and assets recorded on the intertwined ledgers 211. For example, by moving asset recordation to a separate asset ledger 240, the exchange ledger 230 may be made faster and more scalable due to the reduced computation and reduced quantities of data recorded thereon. Moreover, the exchange ledger 230 may be made public while maintaining secure, limited access to tokens and digital assets being transacted against.

Figure 3:
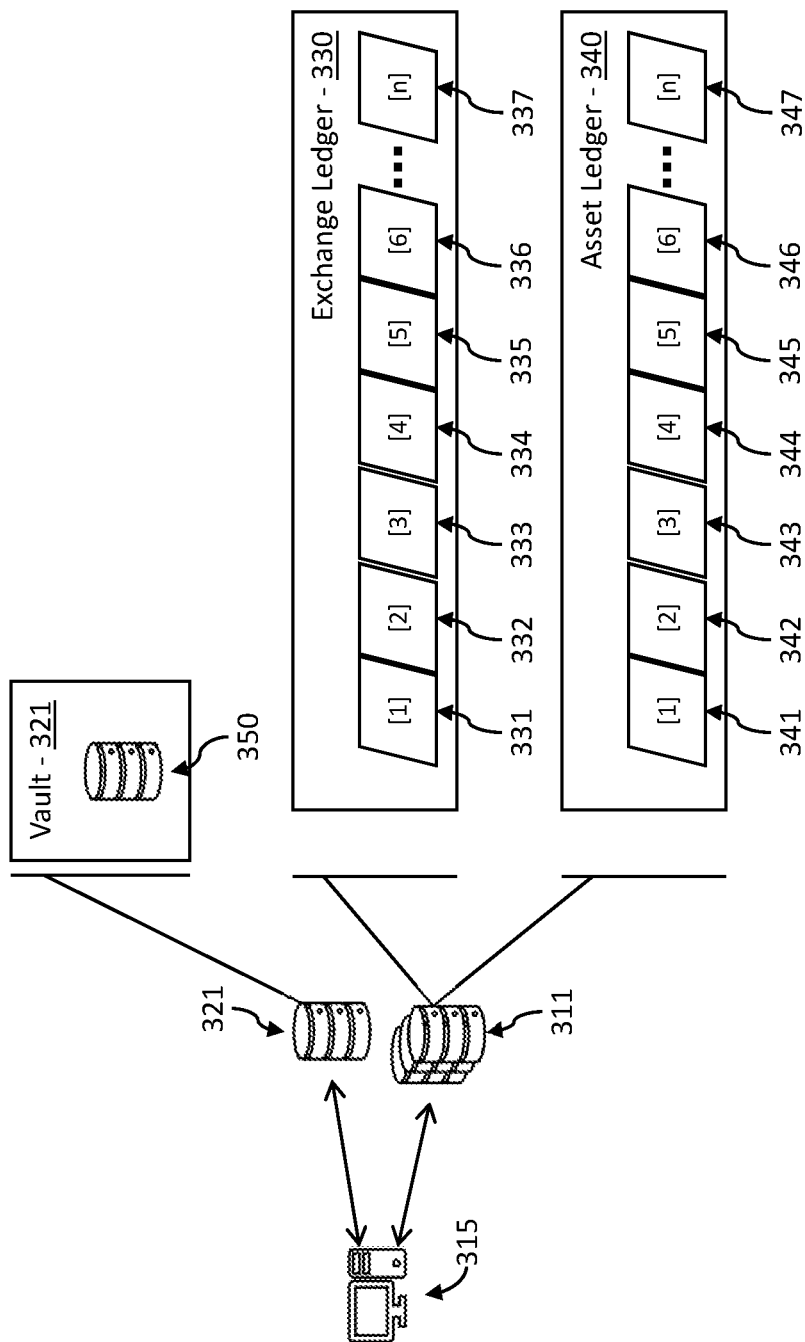

FIG. 3 is a block diagram of another exemplary computer-based system/platform with a blockchain system having differential permissioning and vaulting with multiple ledgers in accordance with one or more embodiments of the present disclosure.

In some embodiments, some nodes, such as node 315 on a distributed network, such as a blockchain network of the distributed network 100 described above, includes a connection to intertwined ledgers 311 as well as custodial permissions of a token vault 321. In some embodiments, the intertwined ledgers 311 and token vault 321 include a single device including the node 315. However, in some embodiments, the exchange ledger 330, the asset ledger 340 and the token vault 321 are maintained across a system of devices in communication with the node 315. In some embodiments, the intertwined ledgers 311 provide a public exchange for transacting tokens and/or digital assets, and a private asset recordation for recording immutable authoritative copies of the tokens and/or digital assets. The public exchange and the private asset recordation interoperate such that permissionless node may only access non-authoritative copies and request transactions, while custodians may manage, modify and/or move the authoritative copies, all through the public exchange. Meanwhile, a permissioned, or custodial node 315 may directly transact with assets, via an exchange ledger 330 to cause changes to the authoritative copies stored in a storage location 350 of the vault 321, as recorded by the asset ledger 340.

In some embodiments, the intertwined ledgers 311 include a public facing ledger and a private facing ledger including an exchange ledger 330 and an asset ledger 340, respectively. The exchange ledger 330 and asset ledger 340 cooperate to facilitate open and public transactions against secured, immutable digital assets with secured, immutable storage recordation. Accordingly, in some embodiments, differential permissioning is applied to the exchange ledger 330 and asset ledger 340 system of intertwined ledgers 311.

In some embodiments, the exchange ledger 330 includes a chain of blocks 331-337 linked together. For example, block [2] 332 may be linked to block [1] 331 by, e.g., incorporating a block hash of the block [1] 331 into a header of the block [2] 332. In some embodiments, any user on the distributed network, such as user of the node 315, may write to the exchange ledger 330 and append a block to the chain. In some embodiments, the user may submit an electronic request for a transaction to the exchange ledger 330. The transaction may include one or more other users on the distributed network, or the transaction may be a single-party transaction. In some embodiments, transactions may include, e.g., an exchange of data items including tokens, digital assets or other data items and combinations thereof, a transfer of data items, aggregating, removing, selling, trading, forfeiting data items, or other transaction. In some embodiments, the transactions may pertain to financial transactions, such as sales, loans, or other exchange of data items representing goods, services, documents, financial instruments, currency, and other assets and combinations thereof.

In some embodiments, a block may record the transaction according to transaction details and data items being transacted. For example, in some embodiments, the electronic request may include transaction details, such as, e.g., the type of transaction, the parties involved, the asset being transacted against including non-authoritative copies of the asset, and any blocks 341-347 in the asset ledger 340 related to the transaction. In some embodiments, to store the transaction data, each block 331-337 may include a container data structure storing one or more of the transactions, including, e.g., data representing the transaction details. The container may then be hashed and added to the blockchain. For example, block [2] 332 is appended to block [1] 331, and block [3] 333 is appended to block [2] 332, etc. as transactions are added to the exchange ledger 330.

In some embodiments, each transaction is hashed to a block by hashing the transaction details into a header for the block. In some embodiments, the data is hashed such that it can be included in a header of the block using, for example, a Merkle root determined using a Merkle tree with the transaction data. In some embodiments, the hash of data can be combined with other header data, such as, e.g., a current time, a block identifier, a previous block identifier, a block version, a hashed header from a previous block, a block height, among other header data and combinations thereof. In some embodiments, the combination of the hashed transaction data and the header data may be hashed to form a current block header. Thus, in some embodiments, the block header of the current block, such as, e.g., block [n] 337, includes a hash of the previous block header, and a hash of the transaction data with a reference to and/or copies of tokens and/or digital assets being transacted against. However, in some embodiments, an authoritative copy of the token and/or digital asset itself may not be included.

Rather, in some embodiments, the asset ledger 340 records the tokens and/or digital assets associated with transactions performed on the exchange ledger 330. In some embodiments, transactions on the exchange ledger 330 are made against existing tokens and/or digital assets recorded on the asset ledger 340. In some embodiments, the existing tokens and/or digital assets include, e.g., authoritative copies of a digitized version of an asset, such as, e.g., an electronic document of a contract, lien, title, loan, security, payable, receivable, equity, or other asset. In some embodiments, the user 312 may not have access to the recorded, authoritative copies on the asset ledger 340. However, in some embodiments, the transactions may affect the tokens and/or digital assets. Thus, in some embodiments, transactions affecting existing tokens and/or assets may be executed on the asset ledger 340 through the use of, e.g., by automated transaction enforcement protocols, such as, e.g., smart contracts, among other transaction devices. Thus, in some embodiments, the exchange ledger 330 may recognize the references to tokens and/or assets in the transaction data of a block 331-337 of the exchange ledger 330, and instantiate, e.g., a smart contract to locate the associated tokens and/or digital assets in a respective block on the asset ledger 340, and update the associated tokens and/or digital assets tokens. In some embodiments, updating the tokens and/or digital assets includes, e.g., generating a new block in the asset ledger 340 for the respective tokens and/or digital assets with new asset owner data.

In some embodiments, a transaction on the exchange ledger 330 forms a new asset. For example, in some embodiments, the new asset includes, e.g., a contract, a payable, a receivable, a loan, a lien, a mortgage, or other digitized asset. Thus, the exchange ledger 330 may instantiate, e.g., a smart contract that generates the digital asset and records the digital asset on the asset ledger 340. In some embodiments, the smart contract also automatically determines a storage location for the digital asset created from the transaction. In some embodiments, the new digital asset is recorded by appending a new block to the asset ledger 340 including, e.g., the asset owner, the storage location, the asset details among other data related to the new digital asset.

In some embodiments, the instantiated smart contract, whether upon a transaction modifying an existing token and/or digital asset, or upon a transaction creating a new digital asset, records the associated token and/or asset to the asset ledger 340 by generating a new block. In some embodiments, the blocks 341-347 of the asset ledger 340 include asset data, such as, e.g., an owner associated with each token and/or asset on a block. Accordingly, the asset data may be hashed to the header of the new block as, e.g., a Merkle root using a Merkle tree. In some embodiments, the header of each block on the asset chain also includes the hash of the previous block header, the time and the hash of the block header for the block on that exchange ledger 330 that created the new digital asset. For example, where a transaction is recorded on the exchange ledger 330, a new exchange block, e.g., block [n] 337 is appended to the chain. The resulting affect to tokens and/or digital assets is recorded to the asset chain 340 by including the hash of the block [n] 337 header. Thus, in some embodiments, the new block on the asset ledger 340 is tied to the associated block on the exchange ledger 330, intertwining the two ledgers. As a result, the asset ledger 340 maintains a record of authoritative tokens and/or digital assets along with references to each transaction affecting each token and/or digital asset such that the exchange ledger 330 may have transactions and blocks 331-337 that do not directly affect the creation of an asset ledger 340 block 341-347 such as, e.g., backups, integrity checks and other transactions.

Moreover, in some embodiments, a storage location may be made immutable and authoritative for each token and/or asset by adding storage location data to the block header of the block on the asset ledger 340. In some embodiments, the asset ledger 340 may receive a storage location identifier from the exchange ledger 330, from the smart contract, or may otherwise automatically determine the storage location associated with each token and/or asset based on where the token and/or digital asset is digitally located. For example, in some embodiments, the storage location may include storage location data including, e.g., a storage device identifier, a storage address, or other storage location data. In some embodiments, the storage location data is hashed or encrypted to form a vault unique identifier (UID), and concatenated in the associated asset block 341-347 header with the block 341-347 header hash. In some embodiments, the block 341-347 header may be hashed with the vault UID, however in some embodiments, the vault UID is concatenated with the hashed header. As a result, in some embodiments, the block 341-347 recording each token and/or digital asset is tied to an authentic storage location, creating an immutable vault holding each associated token and/or asset that is secure from access by non-permissioned users at the node 315.

In some embodiments, ownership of an asset may be recorded by transactions in the exchange ledger 330 while the authoritative copy and its storage location are recorded in the asset ledger 340. Thus, in some embodiments, ownership and custodianship may be separated, such that an owner may transact against a token and/or digital asset, while the custodian, e.g., node 315, maintains the authoritative copy of the token and/or asset in the storage location 350 of the vault 321. In some embodiments, a transaction on the exchange ledger 330 may only modify an asset of the asset ledger 340 where ownership from a user associated with asset can be proven.

In some embodiments, ownership may be implied by a matching of a user identifier with owner information included with the transaction data or other recordation of ownership in the exchange ledger 330. An owner may also have custodianship of the authoritative copy by, e.g., transferring a storage location 350 of the associated token and/or digital asset to a new storage location controlled by the owner. In some embodiments, the transfer may be implemented on the exchange ledger 330, which may instantiate a smart contract to move the authoritative copy to the new storage location, generate a new block on the asset ledger 340 recording the authoritative copy and its new storage location, and invalidating any old blocks recording old storage locations for the token and/or asset. Thus, the authoritative copy is immutably stored and recorded in an up to date fashion on the asset ledger 340, with a record of the transfer recorded on the exchange ledger.

In some embodiments, the node 315 is in custodial control of the vault 321. In some embodiments, custodial controls includes, e.g., physical ownership and administrative control of a storage drive, device, service or other storage location, administrative access to the storage location, including, e.g., licensed, rented, leased or owned cloud service storage, such as, e.g., Amazon AWS™, Google Cloud™, Microsoft Azure™, or other cloud storage solution under the control of the node 315. In some embodiments, the node 315 stores the tokens and/or digital assets in the vault 321, secured using the asset ledger 340 described above. The node 315 may, therefore, exert authority and permission to move, or otherwise manipulate the authoritative copy of a token and/or asset recorded on the asset ledger 340 and stored in linked storage location 350.

In some embodiments, the custodial node 315 may prove custodianship using, e.g., the hash of the header of a block associated with a respective token and/or digital asset, as well as via the hash of the storage location data (e.g., the vault UID). In some embodiments, custodianship may be effectuated by, e.g., a registration process, whereby prospective custodians may register an account and a storage location 350 as a vault 321. Upon registration, the prospective custodian may utilize the registered vault 321 on the intertwined ledger system to hold authoritative assets that are registered against the exchange ledger 330 and asset ledger 340. In some embodiments, other users may also register for various levels of permissions with respect to assets. For example, a broker may register an account as a broker account to view assets. However, in some embodiments, the broker account may only act as custodian of an asset if the bank couples the broker to the bank.

In some embodiments, the vault UID is a cryptographic hash of the storage location data, including storage identifiers, such as, e.g., storage drive hardware identifiers, software identifiers, network addresses, make and model information, addresses within a file structure of the storage device, among other identifiers and combinations thereof. In some embodiments, because the vault UID is the result of a hash, the vault UID may be transparent and anonymous, and permissions for access can be proven by proof of authority. In some embodiments, proof of authority may be shown with a secret key associated with the hash. As a result, a custodian may manipulate a token and/or digital asset in the vault 321 and submit and new block to the asset ledger 340 to record the changes. In some embodiments, upon submission to a set of custodian nodes 315, such as, e.g., a consortium permission on the asset ledger 340, because the vault UID is concatenated in the block header with the block header hash, the proof of authority may be verified by separate verification of each of the vault UID and the block header hash. Thus, both the vault UID and the block hash may be tested independently of each without knowledge of any hash components.

The use of intertwined ledgers 311 facilitates improved performance and security of transactions and assets recorded on the intertwined ledgers 311. For example, by moving asset recordation to a separate asset ledger 340, the exchange ledger 330 may be made faster and more scalable due to the reduced computation and reduced quantities of data recorded thereon. Moreover, the exchange ledger 330 may be made public while maintaining secure, limited access to tokens and digital assets being transacted against.

Figure 4:
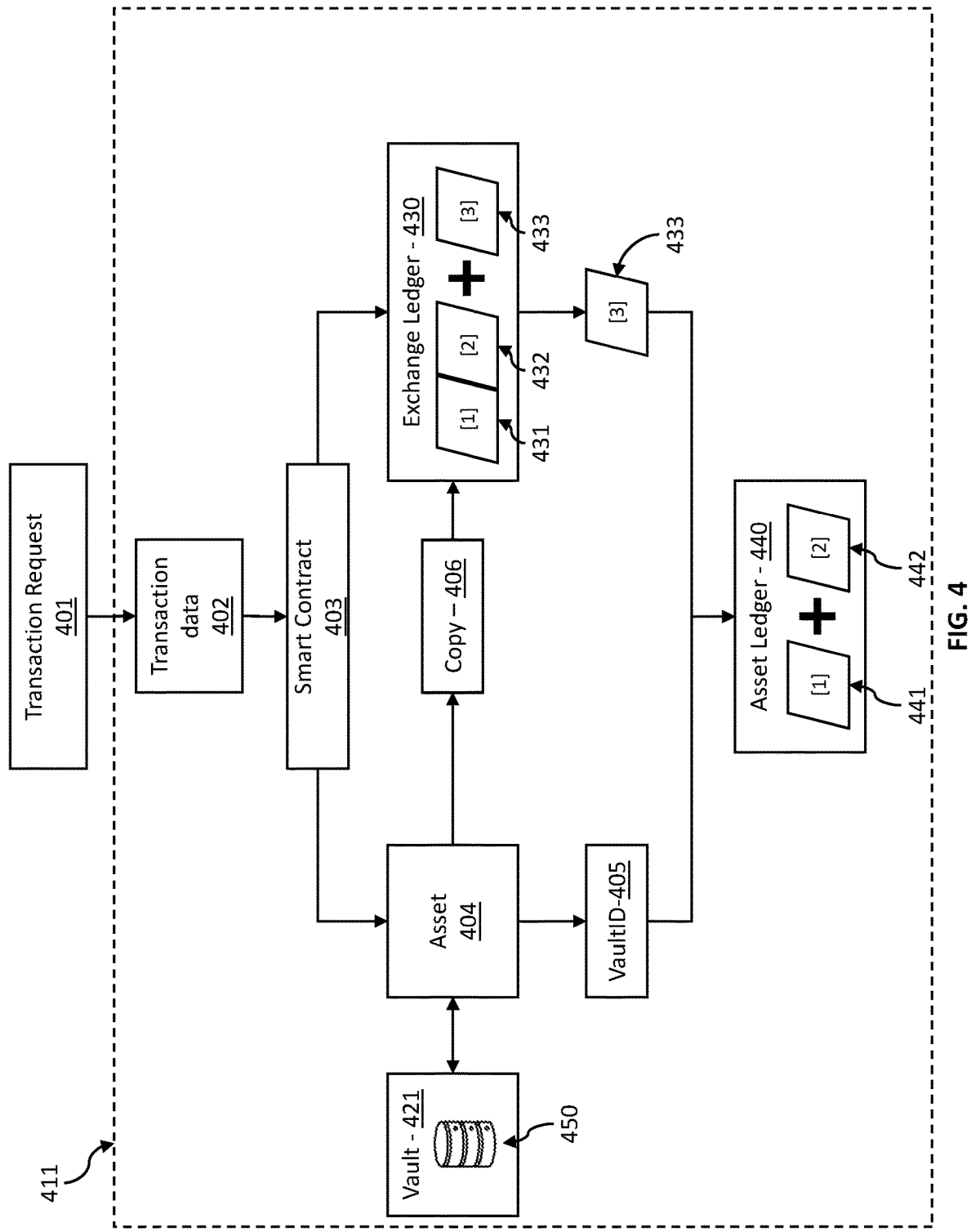

FIG. 4 illustrates a flowchart of an exemplary inventive methodology for intertwined blockchain systems having differential permissioning and vaulting in accordance with one or more embodiments of the present disclosure.

In some embodiments, intertwined ledgers are implemented in an intertwined ledger system 411 on a distributed network, such as, e.g., intertwined blockchain ledgers 111, 211 and/or 311 as described above. In some embodiments, blocks 431-433 of an exchange ledger 430 are linked to blocks 441-442 on an asset ledger 440 to intertwine the two ledgers. In some embodiments, the exchange ledger 430 and the asset ledger 440 may have different permission controls and different security policies. In some embodiments, the exchange ledger 430 and the asset ledger 440 have the same permissioning and security policies. Additional ledgers may be linked to the exchange ledger 430, the asset ledger 440 or both to expand the intertwined ledger system 411.

In some embodiments, the intertwined ledger system 411 may facilitate a public exchange for recording transactions with a provide ledger for recording authoritative digital assets. In some embodiments, to leverage the differential permissioning for such recordations, smart contracts 403 and storage devices 450 may be implemented in connection with the intertwined ledgers of the intertwined ledger system 411. Thus, in some embodiments, an electronic transaction request 401 may be submitted by any node on the network such that the resulting transaction is recorded in the exchange ledger 430, while the underlying digital asset is recorded in the asset ledger 440 without access by non-permissioned nodes.

In some embodiments, the transaction request 401 is provided as an electronic request for a transaction, such as, e.g., an exchange of data items including digital assets or other items, amongst two or more parties. Other transactions may include, e.g., single-party transactions, an exchange of data items including tokens, digital assets or other data items and combinations thereof, a transfer of data items, aggregating, removing, selling, trading, and/or forfeiting data items, or other transaction. In some embodiments, the transactions may pertain to financial transactions, such as sales, loans, or other exchange of data items representing goods, services, documents, financial instruments, currency, and other assets and combinations thereof. In some embodiments, the transactions may include changes to ownership, sharing of digital files, supply chain management actions, identity management, among others and combinations thereof.

Each transaction request 401 may set forth details of the transaction, such as, e.g., the underlying digital asset being transacted, the parties involved, locations of the digital and/or physical assets, a time-stamp, a transaction type, among other details. In some embodiments, transaction data 402 representing the details may be extracted from the transaction request 401 by, e.g., one or more processors at one or more nodes of the intertwined ledger system 411. For example, in some embodiments, the transaction request 401 includes structured data with predefined fields for various transaction details. Examples of structured data may include, e.g., tables, lists, tuples, arrays, indices, among others.

In some embodiments, the transaction data 402 is unstructured, such as, e.g., unstructured lists or tuples, strings, or other unstructured data. In some embodiments, the intertwined ledger system 411 may extract transaction data 402 from the unstructured data via, e.g., language recognition, parsing with parser functions, among other possible extraction and recognition techniques, include techniques employing machine learning and/or artificial intelligence techniques.

In some embodiments, the intertwined ledger system 411 utilizes a smart contract 403 to act on the transaction data 402 and perform the transaction. As used in this disclosure, a smart contract includes self-executing contract having terms of a contract, exchange or other transaction written into lines of code to form a program for executing a transaction upon satisfaction of the terms. In some embodiments, smart contract 403 terms are identified in the transaction data 402. Where all terms are present, e.g., an offer and an acceptance to exchange agreed upon data items between two parties (e.g., two users), the smart contract 403 initiates the transaction of, e.g., tokens and/or digital assets.

In some embodiments, the smart contract 403 causes a digital asset 404 associated with the transaction request 401 to be identified. In some embodiments, the digital asset 404 exists in a vault 421 at a storage location 450. In some embodiments, the vault 421 includes the storage location 450 and a block recording the digital asset 404 in the asset ledger 440. In some embodiments, the smart contract 403 may automatically identify the existing digital asset 404 and the associated vault 421. However, in some embodiments, the transaction data 402 may include the vault 421 of an existing digital asset 404.

Additionally, in some embodiments, the transaction associated with the transaction request 421 may generate an asset, such as, e.g., a contract, a mortgage document, a loan document, a payable document, a receivable document, a securities document, a futures document, among other electronic documents. The smart contract 403 may then generate the digital asset 404 and store the digital asset 404 in a storage location 450, such as, e.g., a storage device including a hard drive, a solid state drive, a magnetoresistive drive, magnetic tape, random access memory (RAM), flash storage, among other storage and memory devices, or in a storage service, such as, e.g., a cloud storage platform including Amazon AWS™, Google Cloud™, Microsoft Azure™, or other storage platform or service.

In some embodiments, the storage location 450 may be identified by a unique identifier, such as, e.g., a device serial number, a device hardware make and model, a network address, a file directory address, or other storage location data and combinations thereof. In some embodiments, the storage location 450 data may form a vault UID 405. In some embodiments, the vault UID 405 is an encrypted or hashed representation of the storage location data, using, e.g., private key or asymmetric encryption, however public key and symmetric encryption are also contemplated.

In some embodiments, the smart contract 403 provides the transaction data 402 to the exchange ledger 430. Additionally, in some embodiments, the smart contract 403 may provide a copy 406 of the digital asset 404 to the exchange ledger 430. Using the transaction data 402 and/or the copy 406, the transaction may be recorded to the exchange ledger 430. In some embodiments, recording in the exchange ledger 430 includes appending an exchange block [3] 433 for the transaction to the exchange ledger 430 by linking the exchange block [3] 433 to a prior exchange block [2] 432, which itself is linked to a prior exchange block [1] 431.

In some embodiments, each exchange block 431-433 includes, e.g., transaction details recorded by the respective block, and metadata including a header of the respective block. Thus, the transaction details of the exchange block [3] 433 may be populated with the transaction data 402. In some embodiments, transaction details may include the full transaction details of the transaction, such as, e.g., the parties involved, the digital asset being transferred, created or otherwise transacted against, the agreed upon terms of the transaction or other details and combinations thereof. In some embodiments, the exchange block [3] 433 is generated using the transaction data 402 by, e.g., generating a hash of the transaction data 402 to include within the header. In some embodiments, the hash may include a Merkle tree. As a result, in some embodiments, the transaction data 402 may be hashed to a Merkle root. Additionally, in some embodiments, the copy 406 is included with the transaction data 402 and may also be hashed in combination with, or independently from the transaction data 402.

In some embodiments, the header may be formed for the exchange block [3] 433 using the hash or hashes of the transaction data 402 and, in some embodiments, the copy 406. The hash is combined with, e.g., a time and a hash of a header for the prior exchange block [2] 432. Adding the header for the prior exchange block [2] 432 links the exchange block [3] 433 to the prior exchange block [2] 432 to extend the blockchain of the exchange ledger 430. The header of the exchange block [3] 433 may then be hashed to generate the header of the exchange block [3] 433 and add it to the exchange ledger 430, thus recording each transaction on the exchange ledger 430.

In some embodiments, upon generating the exchange block [3] 433, the smart contract 403 may use the exchange block 433 and the vault UID 405 to record a new or modified digital asset 404 resulting from the transaction request 401 in an asset block [2] 442 on the asset ledger 440. Indeed, in some embodiments, the smart contract 403 may be a smart contract for asset creation and authoritative ownership assignment of the asset. Therefore, the asset may be submitted to the smart contract 403 for evaluation and addition to the asset ledger based on the rules of contract. Where the asset satisfies the smart contract 403 rules, the new asset 404 may be automatically registered on the exchange ledger 430 and on the asset ledger 440.

In some embodiments, each asset block 441-442 includes, e.g., details recorded by the respective block, and metadata including a header of the respective block. Thus, the transaction details of the asset block [2] 443 may be populated with, e.g., owner details of the digital asset 404 as set forth in the transaction data 402, an asset identifier of the digital asset 404, or other basic asset data and combinations thereof. In some embodiments, the asset block [2] 442 is appended to a blockchain in the asset ledger 440 by linking the asset block [2] 442 to a prior asset block [1] 441 using a hash of the prior asset block [1] 441 header. Each asset block on the asset ledger 440 protected through brokering by the exchange, while direct access to the asset ledger 440 is protected.

In some embodiments, the header may be formed for the asset black [2] 442 using the hash of, e.g., the digital asset 404 owner. The hash is combined with, e.g., a time and a hash of a header for the prior asset block [1] 441. Adding the header for the prior asset block [1] 441 links the asset block [2] 442 to the prior asset block [1] 441 to extend the blockchain of the asset ledger 430, thus recording each transaction.

Moreover, in some embodiments, the asset block [2] 442 is also linked to the exchange block [3] 433 associated with the transaction request 401 and the digital asset 404. The asset block [2] 442 may be linked to the exchange block [3] 433 by combining the hash of the exchange block [3] 433 header with the hash of the header of the prior asset block [1] 441, along with, e.g., the time. The header of the asset block [2] 442 may then be hashed to generate at least a portion of the asset block [2] 442 such that the asset block [2] 442 is linked to both the prior asset block [1] 441 and the exchange block [3] 433. As a result, the headers for each asset block 441-442 is linked to exchange blocks 431-433 having associated transactions. Thus, the exchange ledger 430 and the asset ledger 440 are intertwined such that the exchange ledger 430 may record transactions against an asset without accessing the authoritative digital asset 404 itself, while the asset ledger 440 may record the digital asset 404.

However, in some embodiments, the header of the asset block [2] 442 also includes the vault UID 405 to immutably link the storage location 450 of the digital asset 404 with the digital asset 404, thus forming an immutable record of the authoritative copy of the digital asset 404 in the vault 421 (e.g., "vaulting" the digital asset 404). In some embodiments the vault UID 405 is hashed along with the owner details. However, in some embodiments, the vault UID 405 is concatenated with the already hashed header information. By concatenating the vault UID 405 to the hashed header information, two independent factors of authentication are provided in the asset block header. As a result, in some embodiments, custodianship of the authoritative copy of the digital asset 404 may be verified by verifying both access to the asset chain 440 through permissioning based on the hash of the header information, as well as verification of a private key for hashing the storage location data to create the vault UID 405. Verifying the private key ensures that the user being verified controls the vault 421, and thus is custodian of the digital asset 404.

In some embodiments, the transaction request 401 includes a request for a change of a vault 421. The request is recorded on the exchange ledger 430. In some embodiments, to then transfer custodianship to the owner of the new vault 421, a copy of the digital asset 404 may be provided to the new vault 421 and the new storage location 450. The new vault 421 and storage location 450 may then be hashed to a new vault UID 440 and recorded on the asset ledger 440. As a result, the transfer request and the authoritative copy may be separately recorded in the intertwined ledger system 411 such that the exchange ledger 430 may remain public while asset ownership and custodianship may be permissioned and private on the asset ledger 440.

Figure 5:
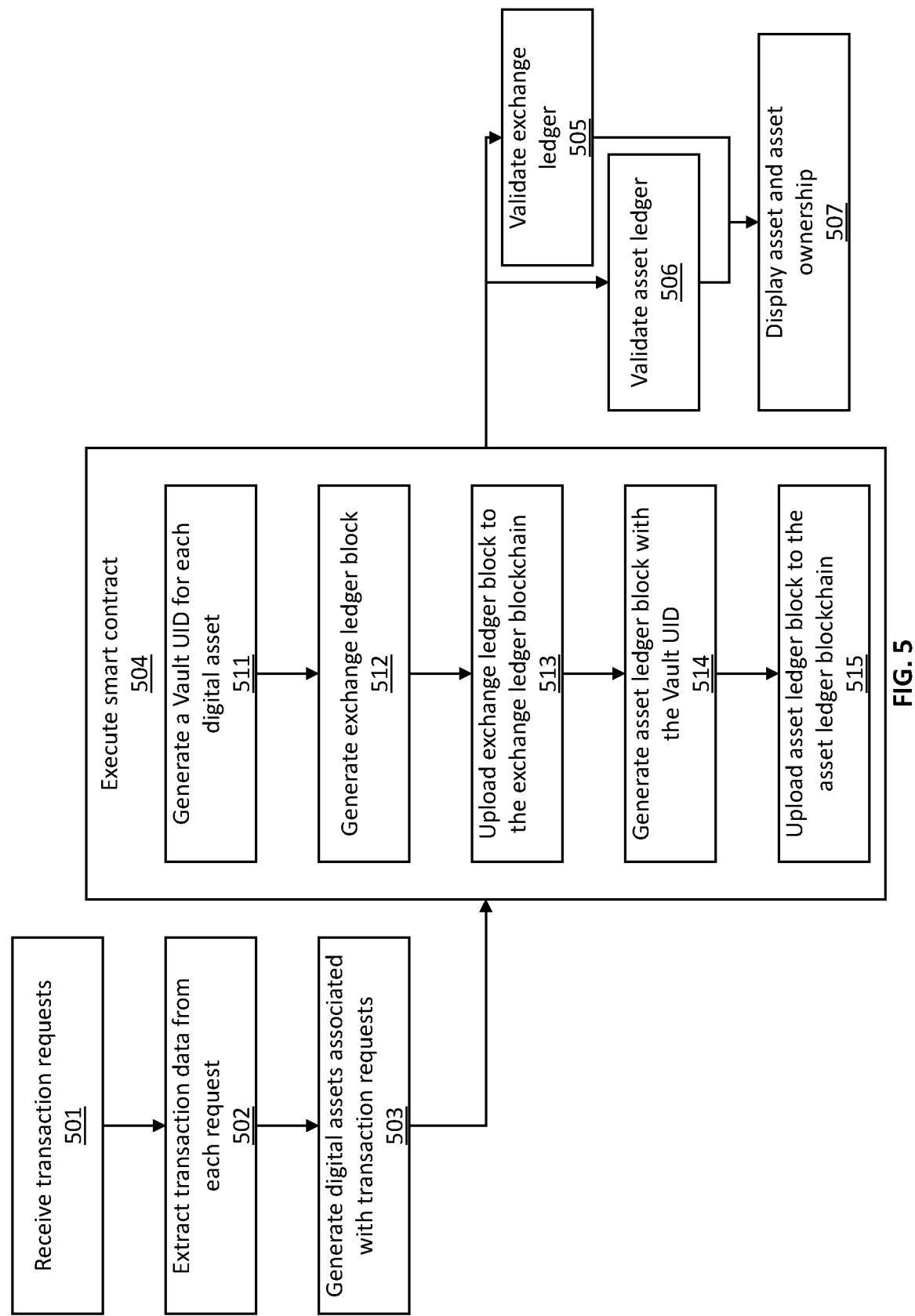

FIG. 5 illustrates a flowchart of an exemplary inventive methodology in accordance with one or more embodiments of the present disclosure.

In some embodiments, a transaction request may be processed on an intertwined ledger system by a smart contract to record both the associated transaction and the affected digital asset with different permission policies between the records. The intertwined ledger system may utilize an exchange ledger for immutably recording transactions against digital assets on a distributed network. Meanwhile, an asset ledger may record authoritative locations of the digital assets themselves, linked to a storage location to facilitate recording an authoritative copy of the digital asset by tying a copy to a storage location. Such an arrangement may facilitate a public exchange ledger while the asset ledger is private. As a result, only owners and/or custodians of digital assets may directly affect an authoritative copy of a digital asset because the asset ledger is permissioned to only permit access by digital asset owners and/or storage location owners. However, a user may engage with the exchange ledger to transact against digital asset by submitting transaction requests, e.g., in the from an electronic request.

In some embodiments, the intertwined ledger system, including, e.g., at least one processor, a memory, a data storage, a cache, a bus, an input/output (I/O) interface, a display, among other computer hardware, receives the transaction requests at block 501. In some embodiments, the transaction requests may include associated transactions for the exchange of data items between users. For example, one of the transactions may include data items including, e.g., digitized assets including electronic documents, cryptocurrency, data files, media, digitized fiat currency such as the United States dollar, the Euro, the Canadian dollar, the Japanese yen, the Chinese Yuan, among other currencies, or digital representations of physical items, among other data items and combinations thereof. The exchange may be a one way transfer from one user to another with nothing in return (e.g., a gift or transfer), a single party one way transfer where a user may transfer data items between, e.g., accounts belonging to the user, two way transfers including trades, sales, promises for trades or sales, loans, mortgages, liens, or other contracts.

In some embodiments, the transaction requests include details identifying source and destination users and/or accounts of each data items being exchanged, terms of the transactions (e.g., contractual terms or conditions for an exchange, etc.) as well as identifying information of each data item, such as digital asset identifiers, digital asset storage locations, among other possible details. In some embodiments, the transaction data representing the details in each transaction may be extracted at block 502.

In some embodiments, the transactions may create one or more assets, such as, e.g., a contract, a loan, a lien, a mortgage, equity, or other financial instrument resulting from the exchange. Thus, in some embodiments, a digital asset for each created asset may be automatically generated based on the associated transaction data. In some embodiments, the digital assets include data identifying an owner of each digital asset and details of each digital asset, such as, terms, conditions, values or items exchanged, parties involved, etc.

In some embodiments, a smart contract 504 may receive the digital assets and transaction requests to, e.g., determine from the transaction data, or otherwise select, a storage location for the digital asset and hashes the storage location data to generate a vault UID at block 511. In some embodiments, the storage location data includes, e.g., a storage drive identifier including hardware and/or software identifiers, storage drive addresses, including network and/or file system addresses, among other identifiers and data.

In some embodiments, the smart contract 504 may record the transaction resulting from the transaction request on a public exchange ledger at block 512. In some embodiments, recording the transaction includes recording the transaction details in a container, including, e.g., a copy of the digital asset in each transaction, owner data of the digital asset in each transaction, parties involved in each transaction, the data items involved, a type of transaction for each transaction being recorded in the container, among other transaction details. The container may include metadata, including an identifier, a time, a height, a nonce, among other metadata. In some embodiments, the container is hashed to the exchange ledger blockchain by, e.g., hashing the transaction details using, e.g., a Merkle tree and then hashing a header of the container (e.g., the block). The header may include the hash of the transaction data, the metadata, a version number and a hash of a header of a prior block on the exchange ledger. In some embodiments, hashing the header links the new block to the prior block on the exchange ledger and appends the transactions to the exchange chain, thus recording each transaction.

In some embodiments, the appended block may then be propagated across a distributed network associated with the exchange chain at block 513. The appended block may be validated at each node in the distributed network by verifying the headers of the blocks on the chain.

In some embodiments, the transaction may affect the digital asset or the creation of a digital asset, as described above. Thus, in some embodiments, the digital asset and modifications thereto may be recorded on a private asset chain at block 514. In some embodiments, an asset block is generated with links to the associated exchange block and to the vault UID of the digital asset. To do so, in some embodiments, a container or block is generated that includes the digital asset details, such as, e.g., an owner of the digital asset. In some embodiments, the block includes metadata, such as, e.g., a time, an identifier, a height, a nonce, among other metadata. The block may then be appended to the asset chain and linked to the exchange ledger and storage location of the digital asset by forming a header with the hash of the metadata, the transaction details, a prior asset block hash on the asset ledger and the associated exchange block hash. Thus, the asset block header includes a hash of both a prior asset block as well as the exchange block generated for the transaction, intertwining the asset ledger with the exchange ledger to tie a digital asset to a transaction while maintaining separate permissioning policies for transactions and for digital assets. Additionally, in some embodiments, the vault ID is concatenated with the asset block hash to link the record of the digital asset to the authoritative storage location of the digital asset, thus forming a secure, immutable and authoritative copy of the digital asset at a storage location, vaulting the digital asset to be secure from tampering or unauthorized modifications. In some embodiments, the vault UID and the asset block hash provide two independent means for verification by, e.g., verifying the hash and/or key for hashing each of the vault UID and the asset block. Accordingly, ownership or custodianship of the digital asset can be proved with, e.g., a private key matching the vault UID hash.

In some embodiments, the appended asset block may then be propagated across a distributed network associated with the asset chain at block 515. The appended block may be validated at each node in the distributed network permissioned on the asset ledger by verifying the headers of the blocks on the chain.

In some embodiments, by propagating the appended blocks for each of the asset ledger and the exchange ledger, the intertwined ledgers are distributed to available nodes on the distributed network. The nodes may then verify the updated exchange ledger at block 505 and the updated asset ledger at block 506 by, e.g., verifying the headers of the blocks.

In some embodiments, upon user selection, the transaction, a copy of the digital asset, and/or ownership of the digital asset may be displayed to the user at block 507. In some embodiments, only an owner or custodian may be permissioned to view ownership of a digital asset due to permission policies of the asset chain. Because the exchange ledger may not include such information, the transactions may be publicly accessible even where the ownership is not.

Figure 6:
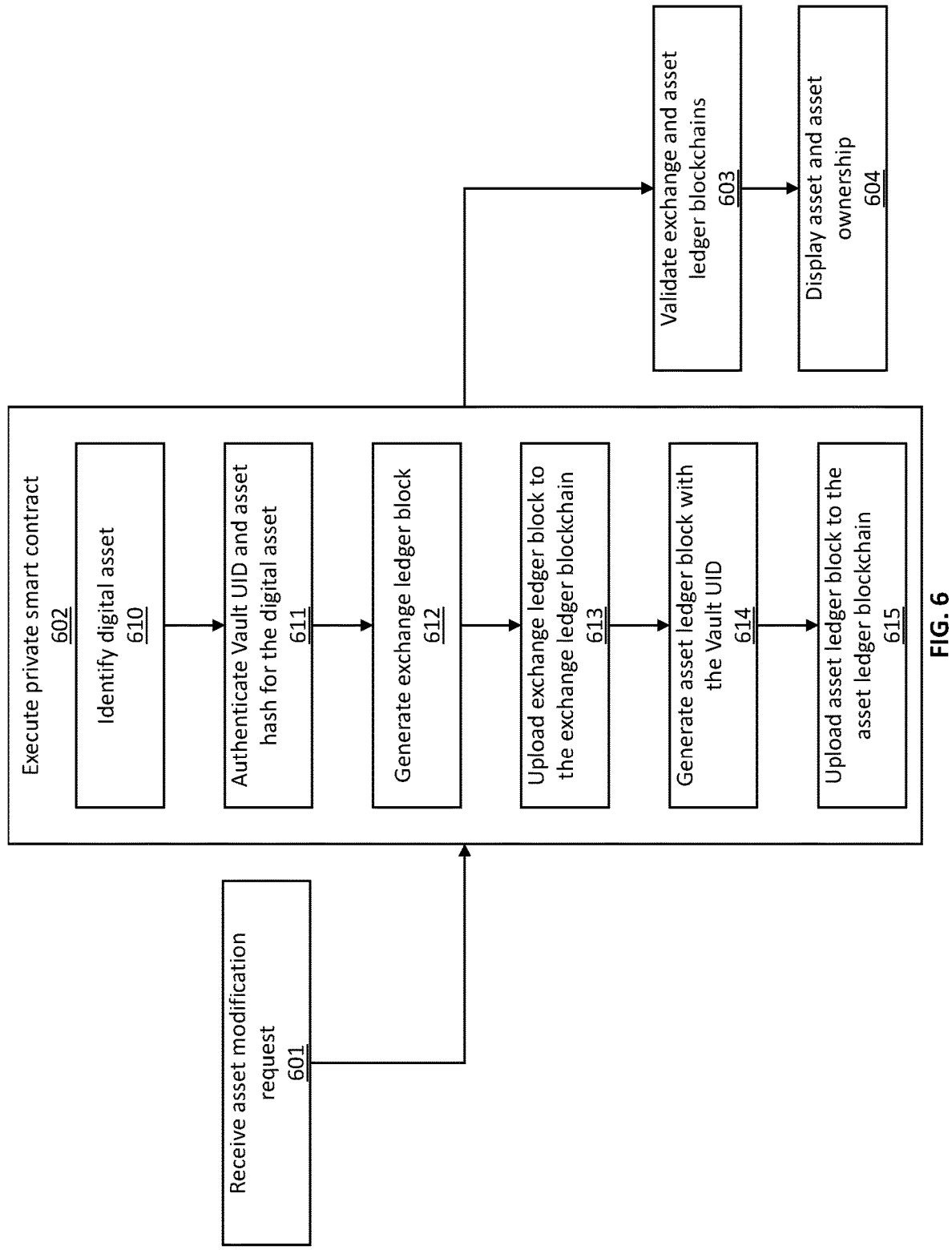

FIG. 6 illustrates a flowchart of an exemplary inventive methodology in accordance with one or more embodiments of the present disclosure.

In some embodiments, a transaction request including an asset modification request may be processed on an intertwined ledger system by a smart contract to record both the associated asset modification and the affected digital asset with different permission policies between the records. The intertwined ledger system may utilize an exchange ledger for immutably recording transactions, including asset modifications, against digital assets on a distributed network. Meanwhile, an asset ledger may immutably record the storage of digital assets in vaults to provide authoritative storage locations by, e.g., linking to a storage location to facilitate immutably recording an authoritative copy of the digital asset. Such an arrangement may facilitate a public exchange ledger tied to a private asset ledger. As a result, only owners and/or custodians of digital assets may directly affect an authoritative copy of a digital asset because the asset ledger is permissioned to only permit access by digital asset owners and/or storage location owners.

In some embodiments, the intertwined ledger system, including, e.g., at least one processor, a memory, a data storage, a cache, a bus, an input/output (I/O) interface, a display, among other computer hardware, receives the asset modification request at block 601. In some embodiments, the asset modification request includes a modification to, e.g., storage location, custodianship, or other change to the digital asset.

In some embodiments, the asset modification may include a digital asset recorded on the asset ledger, such as, e.g., a contract, a loan, a lien, a mortgage, equity, or other financial instrument resulting from the exchange. Thus, in some embodiments, the smart contract 602 may automatically identify a digital asset based on asset modification data. In some embodiments, the digital asset includes data identifying an owner of the digital asset and details of the digital asset, such as, terms, conditions, values or items exchanged, parties involved, etc.

In some embodiments, the smart contract 602 determines from the asset modification data a storage location for the digital asset and hashes the storage location data to validate a vault UID associated with the digital asset of the asset modification data at block 611. In some embodiments, the storage location data includes, e.g., a storage drive identifier including hardware and/or software identifiers, storage drive addresses, including network and/or file system addresses, among other identifiers and data. In some embodiments, the asset modification includes a new storage location, and thus new storage location data. In some embodiments, the smart contract 602 may also, at block 611, identify and authenticate the new storage location by moving a copy of the digital asset to the new storage location.

In some embodiments, the smart contract 602 may record the asset modification resulting from the asset modification request on a public exchange ledger at block 612. In some embodiments, recording the asset modification includes recording the asset modification details in a container or block, including, e.g., a copy of the digital asset, owner data of the digital asset, parties involved, the data items involved, a type of transaction, among other transaction details. The container may include metadata, including an identifier, a time, a height, a nonce, among other metadata. In some embodiments, the container is hashed to the exchange ledger blockchain by, e.g., hashing the asset modification details using, e.g., a Merkle tree and then hashing a header of the container (e.g., the block). The header may include the hash of the asset modification data, the metadata, a version number and a hash of a header of a prior block on the exchange ledger. In some embodiments, hashing the header links the new block to the prior block on the exchange ledger and appends the asset modification to the exchange chain, thus recording the asset modification.

In some embodiments, the appended block may then be propagated across a distributed network associated with the exchange chain at block 613. The appended block may be validated at each node in the distributed network by verifying the headers of the blocks on the chain.

In some embodiments, the digital asset and modifications thereto may be recorded on a private asset chain at block 614. In some embodiments, an asset block is generated with links to the associated exchange block and to the vault UID of the digital asset. To do so, in some embodiments, a container or block is generated that includes the digital asset details, such as, e.g., an owner of the digital asset. In some embodiments, the block includes metadata, such as, e.g., a time, an identifier, a height, a nonce, among other metadata. The block may then be appended to the asset chain and linked to the exchange ledger and storage location of the digital asset by forming a header with the hash of the metadata, the asset modification details, a prior asset block hash on the asset ledger and the associated exchange block hash. Thus, the asset block header includes a hash of both a prior asset block as well as the exchange block generated for the asset modification, intertwining the asset ledger with the exchange ledger to tie a digital asset to a transaction while maintaining separate permissioning policies for transactions and for digital assets.

Additionally, in some embodiments, the vault ID is concatenated with the asset block hash to link the record of the digital asset to the authoritative storage location of the digital asset, thus forming a secure, immutable and authoritative copy of the digital asset at a storage location, vaulting the digital asset to be secure from tampering or unauthorized modifications. In some embodiments, the vault UID and the asset block hash provide two independent means for verification by, e.g., verifying the hash and/or key for hashing each of the vault UID and the asset block. Accordingly, ownership or custodianship of the digital asset can be proved with, e.g., a private key matching the vault UID hash. However, because the digital asset is being modified, such as, e.g., changing the storage location and thus changing the vault UID, the new asset block may also cancel or otherwise invalidate the previous asset block associated with the digital asset to overwrite the authoritative copy.

In some embodiments, operations and/or transactions relative to an asset may be made via the exchange ledger as described above. However, where the transactions indirectly affect the asset, such as, e.g., by making a non-authoritative copy, the exchange ledger via, e.g., a smart contract, may automatically add the non-authoritative copy to a new block on the exchange ledger without any changes to the asset ledger. This is because the making of a non-authoritative copy does not directly affect any details recorded on the asset ledger. Accordingly, blocks 614 and 615 may be skipped where the details to the asset are unaffected. However, if details of an asset recorded on the asset block are directly affected by, e.g., changing ownership or vault location, the exchange ledger may, e.g., via the smart contract 602, cause a new asset ledger block to record such changes as per blocks 614 and 615.

In some embodiments, the appended asset block may then be propagated across a distributed network associated with the asset chain at block 615. The appended block may be validated at each node in the distributed network permissioned on the asset ledger by verifying the headers of the blocks on the chain.

In some embodiments, by propagating the appended blocks for each of the asset ledger and the exchange ledger, the intertwined ledgers are distributed to available nodes on the distributed network. The nodes may then verify the updated intertwined ledgers at block 603 by, e.g., verifying the headers of the blocks.

In some embodiments, upon user selection, the transaction, a copy of the digital asset, and/or ownership of the digital asset may be displayed to the user at block 604. In some embodiments, only an owner or custodian may be permissioned to view ownership of a digital asset due to permission policies of the asset chain. Because the exchange ledger may not include such information, the transactions may be publicly accessible even where the ownership is not.

Figure 7:
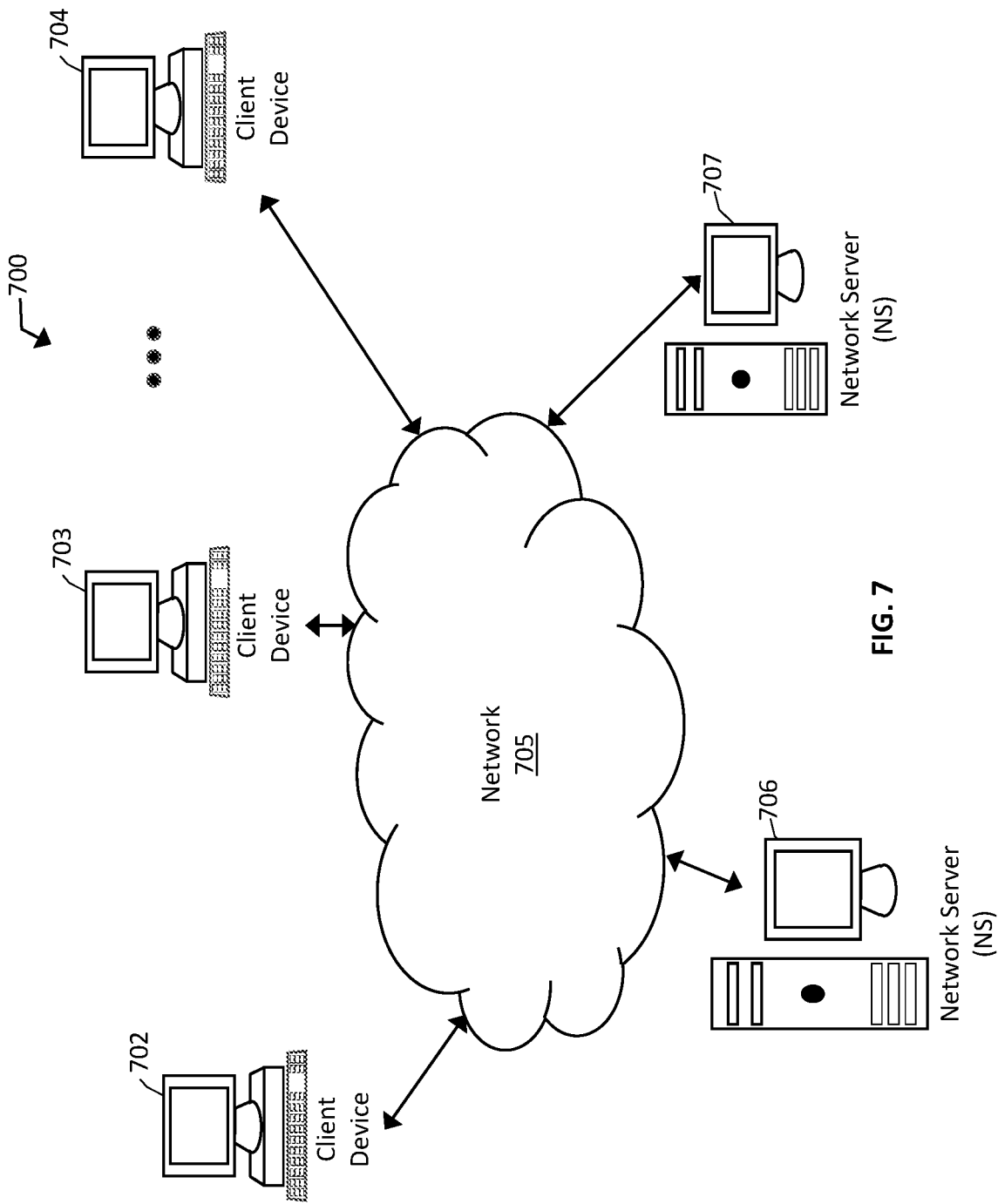

FIG. 7 depicts a block diagram of an exemplary computer-based system/platform 700 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 700 may be configured to manage a large number of members and/or concurrent transactions, as detailed herein. In some embodiments, the exemplary computer-based system/platform 700 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 7, members 702-704 (e.g., clients) of the exemplary computer-based system/platform 700 may include virtually any computing device capable of receiving and sending a message over a network (e.g., cloud network), such as network 705, to and from another computing device, such as servers 706 and 707, each other, and the like. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-704 may include may run one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed to include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer or machine readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 7, in some embodiments, the exemplary server 706 or the exemplary server 707 may have connections to external systems like email, SMS messaging, text messaging, ad content providers, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MIMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 8:
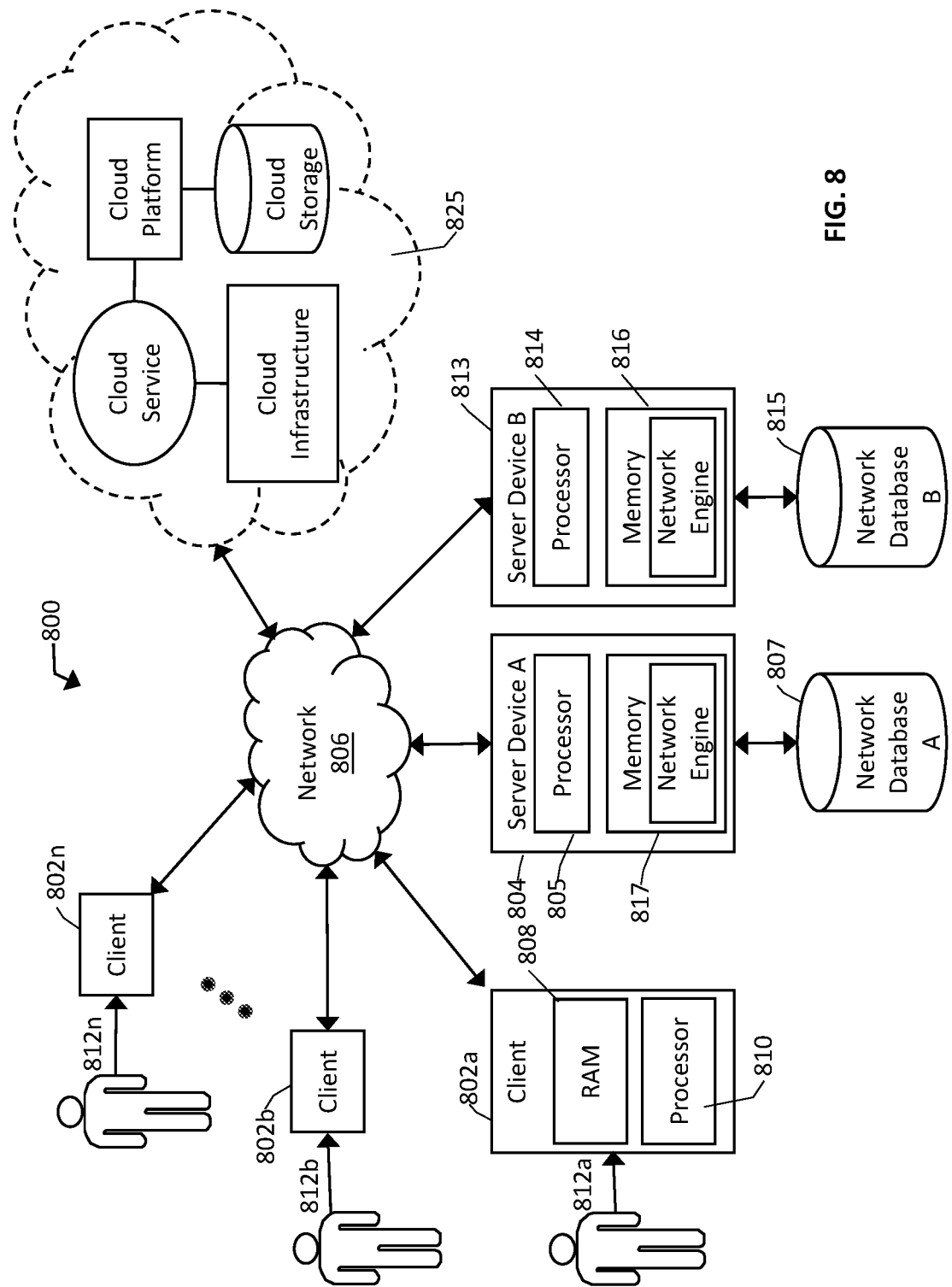

FIG. 8 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 802a, 802b thru 802n shown each at least includes a computer-readable medium, such as a random-access memory (RAM) 808 coupled to a processor 810 or FLASH memory. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a-n may also comprise a number of external or internal devices such as a mouse, a CD-ROM, DVD, a physical or virtual keyboard, a display, or other input or output devices. In some embodiments, examples of member computing devices 802a-n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a-n may be specifically programmed with one or more application programs in accordance with one or more principles/methodologies detailed herein. In some embodiments, member computing devices 802a-n may operate on any operating system capable of supporting a browser or browser-enabled application, such as Microsoft™, Windows™, and/or Linux. In some embodiments, member computing devices 802a-n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a-n, users, 812a-n, may communicate over the exemplary network 806 with each other and/or with other systems and/or devices coupled to the network 806. As shown in FIG. 8, exemplary server devices 804 and 813 may be also coupled to the network 806. In some embodiments, one or more member computing devices 802a-n may be mobile clients.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 9:
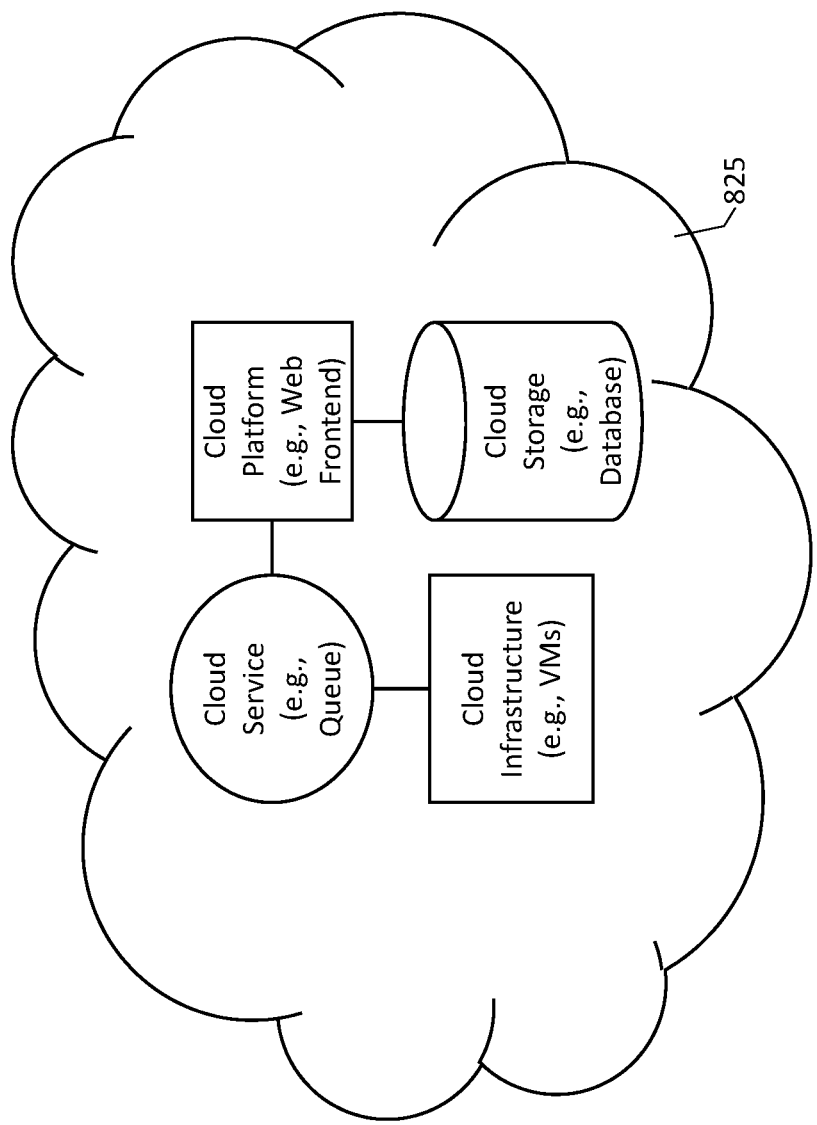
Figure 10:
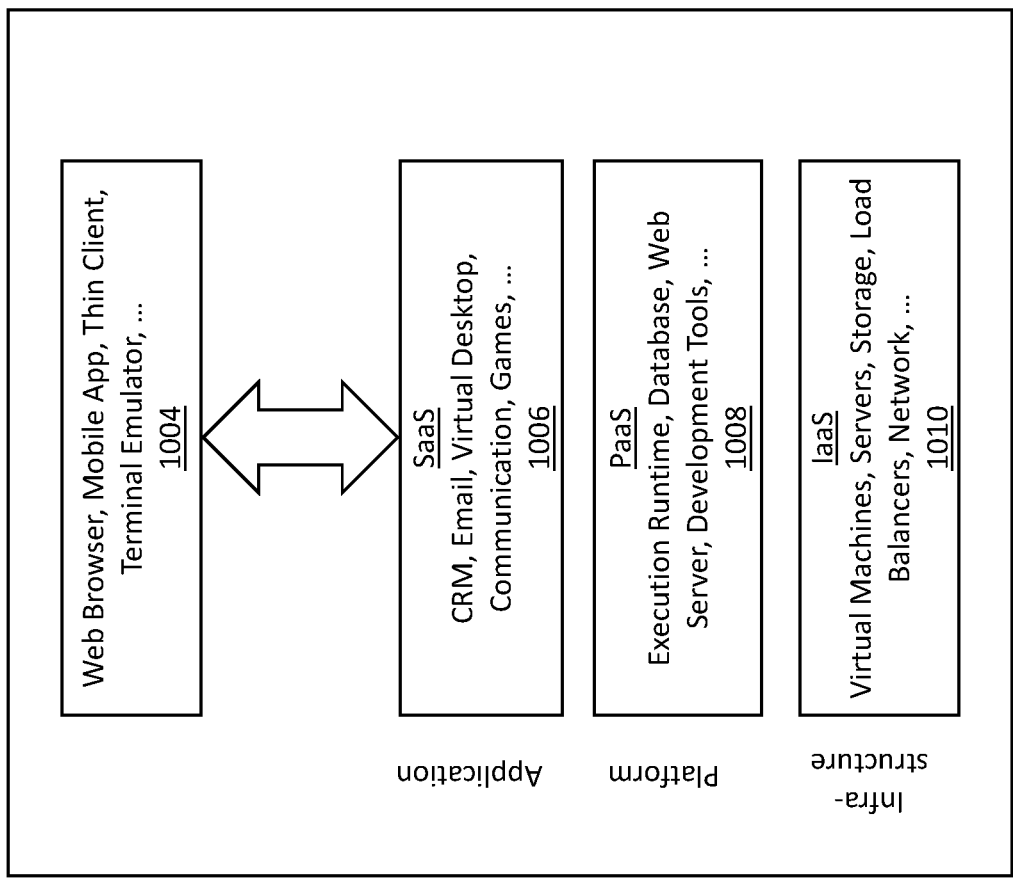

In some embodiments, the exemplary inventive computer-based systems/platforms, the exemplary inventive computer-based devices, and/or the exemplary inventive computer-based components of the present disclosure may be specifically configured to operate in an cloud computing/architecture such as, but not limiting to: infrastructure a service (IaaS), platform as a service (PaaS), and/or software as a service (SaaS). FIGS. 9 and 10 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

In some embodiments, the exemplary inventive computer-based systems/platforms, the exemplary inventive computer-based devices, and/or the exemplary inventive computer-based components of the present disclosure may be configured interact and/or to store data in one or more private and/or private-permissioned cryptographically-protected, distributed databased such as, without limitation, a blockchain (distributed ledger technology), Ethereum (Ethereum Foundation, Zug, Switzerland), and/or other similar distributed data management technologies. For example, as utilized herein, the distributed database(s), such as distributed ledgers ensure the integrity of data by generating a chain of data blocks linked together by cryptographic hashes of the data records in the data blocks. For example, a cryptographic hash of at least a portion of data records within a first block, and, in some cases, combined with a portion of data records in previous blocks is used to generate the block address for a new digital identity block succeeding the first block. As an update to the data records stored in the one or more data blocks, a new data block is generated containing respective updated data records and linked to a preceding block with an address based upon a cryptographic hash of at least a portion of the data records in the preceding block. In other words, the linked blocks form a blockchain that inherently includes a traceable sequence of addresses that can be used to track the updates to the data records contained therein. The linked blocks (or blockchain) may be distributed among multiple network nodes within a computer network such that each node may maintain a copy of the blockchain. Malicious network nodes attempting to compromise the integrity of the database must recreate and redistribute the blockchain faster than the honest network nodes, which, in most cases, is computationally infeasible. In other words, data integrity is guaranteed by the virtue of multiple network nodes in a network having a copy of the same blockchain. In some embodiments, as utilized herein, a central trust authority for sensor data management may not be needed to vouch for the integrity of the distributed database hosted by multiple nodes in the network.

In some embodiments, the exemplary distributed blockchain-type ledger implementations of the present disclosure with associated devices may be configured to affect transactions involving Bitcoins and other cryptocurrencies into one another and also into (or between) so-called FIAT money or FIAT currency and vice versa.

In some embodiments, the exemplary distributed blockchain-type ledger implementations of the present disclosure with associated devices are configured to utilize smart contracts that are computer processes that facilitate, verify and/or enforce negotiation and/or performance of one or more particular activities among users/parties. For example, an exemplary smart contract may be configured to be partially or fully self-executing and/or self-enforcing. In some embodiments, the exemplary inventive asset-tokenized distributed blockchain-type ledger implementations of the present disclosure may utilize smart contract architecture that can be implemented by replicated asset registries and contract execution using cryptographic hash chains and Byzantine fault tolerant replication. For example, each node in a peer-to-peer network or blockchain distributed network may act as a title registry and escrow, thereby executing changes of ownership and implementing sets of predetermined rules that govern transactions on the network. For example, each node may also check the work of other nodes and in some cases, as noted above, function as miners or validators.

At least some aspects of the present disclosure will now be described with reference to the following numbered clauses.

1. A method comprising:
   receiving, by at least one processor, an electronic request to exchange data items between a first user and a second user;
   generating, by the at least one processor, a digital asset associated with the exchange of the data items;
      wherein the digital asset comprises:
         i) a vault unique identifier, and
         ii) an asset owner comprising the first user, the second user, or both;
      wherein the vault unique identifier comprises a hash of storage location data;
      wherein the storage location data comprises at least a storage drive identifier associated with a storage location for storing the digital asset;
   generating, by the at least one processor, an exchange block on an exchange chain to record the electronic request;
      wherein the exchange block comprises an exchange block header;
      wherein the exchange block header comprises an exchange block hash based at least in part on:
         i) the electronic request,
         ii) the data items, and
         iii) at least one prior exchange block header associated with at least one prior exchange block on the exchange chain;
   generating, by the at least one processor, an asset copy on the exchange ledger chain to record a non-permissioned copy of the digital asset independent from the vault unique identifier;
      wherein the non-permissioned copy of the digital asset is configured to be transferred on the exchange chain independent from the storage location;
   generating, by the at least one processor, an asset block on an asset ledger chain to record an authoritative copy of the digital asset associated with the exchange of the data items on the exchange chain;
      wherein the asset ledger chain comprises a permissioned ledger different from the exchange chain;
      wherein the asset block comprises an asset block header;
      wherein the asset block header comprises an asset block hash concatenated with the vault unique identifier associated with the digital asset;
      wherein the asset block hash comprises a hash based at least in part on:
         i) the exchange block header,
         ii) an asset identifier that identifies the digital asset, and
         iii) at least one prior asset block header associated with at least one prior asset block on the asset ledger chain;
      wherein the asset block hash and the vault unique identifier comprise independent factors of authentication of the digital asset;
   causing to display, by the at least one processor, the authoritative copy of the digital asset associated with the electronic request.

2. The method as recited in claim 1, wherein the at least one processor utilizes a smart contract to generate the asset block based at least in part on the exchange block.

3. The method as recited in claim 1, further comprising:
   authenticating, by the at least one processor, a custodian associated with the digital asset based at least in part on a verification of the asset block hash and the hash associated with the vault unique identifier;
   modifying, by the at least one processor, the storage location data associated with the digital asset with new storage location data associated with a new storage location; and
   wherein the new storage location data comprises a new hash of the new storage location data to form a new vault unique identifier.

4. The method as recited in claim 1, further comprising verifying, by the at least one processor, rights of the first user, the second user, or both to generate the digital asset based at least in part on the vault unique identifier.

5. The method as recited in claim 1, further comprising verifying, by the at least one processor, rights of at least user to exchange the digital asset based at least in part on the vault unique identifier.

6. The method as recited in claim 1, wherein the digital asset comprises a digitized financial instrument.

7. The method as recited in claim 1, wherein the digital asset comprises a digitized physical asset.

8. The method as recited in claim 1, wherein an owner associated with the digital asset and a custodian associated with the storage location are different.

9. A method comprising:
   receiving, by at least one processor, an electronic request to modify at least one digital asset associated with at least one user according to at least one modification;
     wherein each respective digital asset of the at least one digital asset comprises:
       i) a vault unique identifier associated with an authentic storage location of each respective digital asset,
       ii) at least one data item representing the at least one modification associated with each respective digital asset, and
       ii) an asset owner associated with each respective digital asset;
     wherein the vault unique identifier comprises a hash of storage location data;
     wherein the storage location data comprises at least a storage drive identifier associated with a storage location for storing each respective digital asset;
   generating, by the at least one processor, an exchange block on an exchange chain to record the electronic request;
     wherein the exchange block comprises an exchange block header;
     wherein the exchange block header comprises an exchange block hash based at least in part on:
       i) the electronic request,
       ii) the at least one data item, and
       iii) at least one prior exchange block header associated with at least one prior exchange block on the exchange chain;
   generating, by the at least one processor, an asset copy on the exchange ledger chain to record a non-permissioned copy of each respective digital asset independent from the vault unique identifier of each respective digital asset;
     wherein the non-permissioned copy of each respective digital asset is configured to be modified on the exchange chain independent from the storage location;
   generating, by the at least one processor, an asset block on an asset ledger chain to record an authoritative copy of the at least one digital asset with the at least one modification associated with the electronic request;
     wherein the asset ledger chain comprises a permissioned ledger different from the exchange chain;
     wherein the asset block comprises an asset block header;
     wherein the asset block header comprises an asset block hash concatenated with the vault unique identifier associated with each respective digital asset;
     wherein the asset block hash comprises a hash based at least in part on:
       i) the exchange block header,
       ii) an asset identifier that identifies each respective digital asset, and
       iii) at least one prior asset block header associated with at least one prior asset block of each respective digital asset on the asset ledger chain;
     wherein the asset block hash and the vault unique identifier comprise independent factors of authentication of the at least one digital asset;
   causing to display, by the at least one processor, the authoritative copy of each respective digital asset associated with the electronic request.

10. The method as recited in claim 9, wherein the at least one processor utilizes a smart contract to generate the asset block based at least in part on the exchange block.

11. The method as recited in claim 9, further comprising:
   authenticating, by the at least one processor, a custodian associated with each respective digital asset based at least in part on a verification of the asset block hash and the hash associated with each respective vault unique identifier;
   modifying, by the at least one processor, the storage location data associated with each respective digital asset with new storage location data associated with a new storage location for each respective digital asset; and
   wherein the new storage location data comprises a new hash of the new storage location data to form a new vault unique identifier.

12. The method as recited in claim 9, further comprising verifying, by the at least one processor, rights of at least one user to generate the digital asset based at least in part on the vault unique identifier.

13. The method as recited in claim 9, further comprising verifying, by the at least one processor, rights of at least user to exchange each respective digital asset based at least in part on the vault unique identifier associated with each respective digital asset.

14. The method as recited in claim 9, wherein one or more digital assets of the at least one digital asset comprises a digitized financial instrument.

15. The method as recited in claim 9, wherein one or more digital assets of the at least one digital asset comprises a digitized physical asset.

16. The method as recited in claim 9, wherein an owner associated with at least one respective digital asset and a custodian associated with the storage location of the at least one respective digital asset are different.

17. A system comprising:
   a distributed network of at least one node;
   at least one processor in communication with the distributed network;
     wherein the at least one processor is configured to:
       receive an electronic request to exchange data items between a first user and a second user;
       generate a digital asset associated with the exchange of the data items;
         wherein the digital asset comprises:
           i) a vault unique identifier, and
           ii) an asset owner comprising the first user, the second user, or both;

wherein the vault unique identifier comprises a hash of storage location data;
wherein the storage location data comprises at least a storage drive identifier associated with a storage location for storing the digital asset;
generate an exchange block on an exchange chain to record the electronic request;
wherein the exchange block comprises an exchange block header;
wherein the exchange block header comprises an exchange block hash based at least in part on:
i) the electronic request,
ii) the data items, and
iii) at least one prior exchange block header associated with at least one prior exchange block on the exchange chain;
generating, by the at least one processor, an asset copy on the exchange ledger chain to record a non-permissioned copy of the digital asset independent from the vault unique identifier;
wherein the non-permissioned copy of the digital asset is configured to be transferred on the exchange chain independent from the storage location;
generate an asset block on an asset ledger chain to record an authoritative copy of the digital asset associated with the exchange of the data items on the exchange chain;
wherein the asset ledger chain comprises a permissioned ledger different from the exchange chain;
wherein the asset block comprises an asset block header;
wherein the asset block header comprises an asset block hash concatenated with the vault unique identifier associated with the digital asset;
wherein the asset block hash comprises a hash based at least in part on:
i) the exchange block header,
ii) an asset identifier that identifies the digital asset, and
iii) at least one prior asset block header associated with at least one prior asset block on the asset ledger chain;
wherein the asset block hash and the vault unique identifier comprise independent factors of authentication of the digital asset;
cause to display the authoritative copy of the digital asset associated with the electronic request on a screen of at least one computing device associated with at least one user.

18. The method as recited in claim 17, wherein the at least one processor is further configured to:
authenticate a custodian associated with each respective digital asset based at least in part on a verification of the asset block hash and the hash associated with each respective vault unique identifier;
modify the storage location data associated with each respective digital asset with new storage location data associated with a new storage location for each respective digital asset; and
wherein the new storage location data comprises a new hash of the new storage location data to form a new vault unique identifier.

19. The method as recited in claim 17, wherein the at least one processor is further configured to verify rights of at least one user to generate the digital asset based at least in part on the vault unique identifier.

20. The method as recited in claim 17, wherein the at least one processor is further configured to verify rights of at least user to exchange each respective digital asset based at least in part on the vault unique identifier associated with each respective digital asset.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:
1. A method comprising:
receiving, by at least one processor, an electronic request to exchange data items between a first user and a second user;
generating, by the at least one processor, a digital asset associated with the exchange of the data items;
wherein the digital asset comprises:
i) a vault unique identifier, and
ii) an asset owner comprising the first user, the second user, or both;
wherein the vault unique identifier comprises a hash of storage location data;
wherein the storage location data comprises at least a storage drive identifier associated with a storage location for storing the digital asset;
generating, by the at least one processor, an exchange block on an exchange chain to record the electronic request;
wherein the exchange block comprises an exchange block header;
wherein the exchange block header comprises an exchange block hash based at least in part on:
i) the electronic request,
ii) the data items, and
iii) at least one prior exchange block header associated with at least one prior exchange block on the exchange chain;
generating, by the at least one processor, an asset copy on the exchange chain to record a non-permissioned copy of the digital asset independent from the vault unique identifier;
wherein the non-permissioned copy of the digital asset is configured to be transferred on the exchange chain independent from the storage location;
generating, by the at least one processor, an asset block on an asset ledger chain to record an authoritative copy of the digital asset associated with the exchange of the data items on the exchange chain;
wherein the asset ledger chain comprises a permissioned ledger different from the exchange chain;
wherein the asset block comprises an asset block header;
wherein the asset block header comprises an asset block hash concatenated with the vault unique identifier associated with the digital asset;
wherein the asset block hash comprises a hash based at least in part on:
i) the exchange block header,
ii) an asset identifier that identifies the digital asset, and iii) at least one prior asset block header associated with at least one prior asset block on the asset ledger chain;

wherein the asset block hash and the vault unique identifier comprise independent factors of authentication of the digital asset; and causing to display, by the at least one processor, the authoritative copy of the digital asset associated with the electronic request.

2. The method as recited in claim 1, wherein the at least one processor utilizes a smart contract to generate the asset block based at least in part on the exchange block.

3. The method as recited in claim 1, further comprising:

authenticating, by the at least one processor, a custodian associated with the digital asset based at least in part on a verification of the asset block hash and the hash associated with the vault unique identifier;

modifying, by the at least one processor, the storage location data associated with the digital asset with new storage location data associated with a new storage location; and wherein the new storage location data comprises a new hash of the new storage location data to form a new vault unique identifier.

4. The method as recited in claim 1, further comprising verifying, by the at least one processor, rights of the first user, the second user, or both to generate the digital asset based at least in part on the vault unique identifier.

5. The method as recited in claim 1, further comprising verifying, by the at least one processor, rights of at least user to exchange the digital asset based at least in part on the vault unique identifier.

6. The method as recited in claim 1, wherein the digital asset comprises a digitized financial instrument.

7. The method as recited in claim 1, wherein the digital asset comprises a digitized physical asset.

8. The method as recited in claim 1, wherein an owner associated with the digital asset and a custodian associated with the storage location are different.

9. A method comprising:

receiving, by at least one processor, an electronic request to modify at least one digital asset associated with at least one user according to at least one modification;

wherein each respective digital asset of the at least one digital asset comprises:

i) a vault unique identifier associated with an authentic storage location of each respective digital asset, ii) at least one data item representing the at least one modification associated with each respective digital asset, and ii) an asset owner associated with each respective digital asset;

wherein the vault unique identifier comprises a hash of storage location data;

wherein the storage location data comprises at least a storage drive identifier associated with a storage location for storing each respective digital asset;

generating, by the at least one processor, an exchange block on an exchange chain to record the electronic request;

wherein the exchange block comprises an exchange block header;

wherein the exchange block header comprises an exchange block hash based at least in part on:

i) the electronic request, ii) the at least one data item, and iii) at least one prior exchange block header associated with at least one prior exchange block on the exchange chain;

generating, by the at least one processor, an asset copy on the exchange chain to record a non-permissioned copy of each respective digital asset independent from the vault unique identifier of each respective digital asset;

wherein the non-permissioned copy of each respective digital asset is configured to be modified on the exchange chain independent from the storage location;

generating, by the at least one processor, an asset block on an asset ledger chain to record an authoritative copy of the at least one digital asset with the at least one modification associated with the electronic request;

wherein the asset ledger chain comprises a permissioned ledger different from the exchange chain;

wherein the asset block comprises an asset block header;

wherein the asset block header comprises an asset block hash concatenated with the vault unique identifier associated with each respective digital asset;

wherein the asset block hash comprises a hash based at least in part on:

i) the exchange block header, ii) an asset identifier that identifies each respective digital asset, and iii) at least one prior asset block header associated with at least one prior asset block of each respective digital asset on the asset ledger chain;

wherein the asset block hash and the vault unique identifier comprise independent factors of authentication of the at least one digital asset; and causing to display, by the at least one processor, the authoritative copy of each respective digital asset associated with the electronic request.

10. The method as recited in claim 9, wherein the at least one processor utilizes a smart contract to generate the asset block based at least in part on the exchange block.

11. The method as recited in claim 9, further comprising:

authenticating, by the at least one processor, a custodian associated with each respective digital asset based at least in part on a verification of the asset block hash and the hash associated with each respective vault unique identifier;

modifying, by the at least one processor, the storage location data associated with the each respective digital asset with new storage location data associated with a new storage location for each respective digital asset; and wherein the new storage location data comprises a new hash of the new storage location data to form a new vault unique identifier.

12. The method as recited in claim 9, further comprising verifying, by the at least one processor, rights of at least one user to generate the digital asset based at least in part on the vault unique identifier.

13. The method as recited in claim 9, further comprising verifying, by the at least one processor, rights of at least user to exchange each respective digital asset based at least in part on the vault unique identifier associated with the each respective digital asset.

14. The method as recited in claim 9, wherein one or more digital assets of the at least one digital asset comprises a digitized financial instrument.

15. The method as recited in claim 9, wherein one or more digital assets of the at least one digital asset comprises a digitized physical asset.

16. The method as recited in claim 9, wherein an owner associated with at least one respective digital asset and a custodian associated with the storage location of the at least one respective digital asset are different.

17. A system comprising:
a distributed network of at least one node;
at least one hardware processor in communication with the distributed network;
wherein the at least one hardware processor is configured to:
   receive an electronic request to exchange data items between a first user and a second user;
   generate a digital asset associated with the exchange of the data items;
      wherein the digital asset comprises:
         i) a vault unique identifier, and
         ii) an asset owner comprising the first user, the second user, or both;
      wherein the vault unique identifier comprises a hash of storage location data;
      wherein the storage location data comprises at least a storage drive identifier associated with a storage location for storing the digital asset;
   generate an exchange block on an exchange chain to record the electronic request;
      wherein the exchange block comprises an exchange block header;
      wherein the exchange block header comprises an exchange block hash based at least in part on:
         i) the electronic request,
         ii) the data items, and
         iii) at least one prior exchange block header associated with at least one prior exchange block on the exchange chain;
   generate an asset copy on the exchange chain to record a non-permissioned copy of the digital asset independent from the vault unique identifier;
      wherein the non-permissioned copy of the digital asset is configured to be transferred on the exchange chain independent from the storage location;
   generate an asset block on an asset ledger chain to record an authoritative copy of the digital asset associated with the exchange of the data items on the exchange chain;
      wherein the asset ledger chain comprises a permissioned ledger different from the exchange chain;
      wherein the asset block comprises an asset block header;
      wherein the asset block header comprises an asset block hash concatenated with the vault unique identifier associated with the digital asset;
      wherein the asset block hash comprises a hash based at least in part on:
         i) the exchange block header,
         ii) an asset identifier that identifies the digital asset, and
         iii) at least one prior asset block header associated with at least one prior asset block on the asset ledger chain;
      wherein the asset block hash and the vault unique identifier comprise independent factors of authentication of the digital asset; and
   cause to display the authoritative copy of the digital asset associated with the electronic request on a screen of at least one computing device associated with at least one user.

18. The method as recited in claim 17, wherein the at least one hardware processor is further configured to:
   authenticate a custodian associated with each respective digital asset based at least in part on a verification of the asset block hash and the hash associated with each respective vault unique identifier;
   modify the storage location data associated with the each respective digital asset with new storage location data associated with a new storage location for the each respective digital asset; and
   wherein the new storage location data comprises a new hash of the new storage location data to form a new vault unique identifier.

19. The method as recited in claim 17, wherein the at least one hardware processor is further configured to verify rights of at least one user to generate the digital asset based at least in part on the vault unique identifier.

20. The method as recited in claim 17, wherein the at least one hardware processor is further configured to verify rights of at least user to exchange each respective digital asset based at least in part on the vault unique identifier associated with each respective digital asset.

* * * * *